US011363866B2

(12) United States Patent
De Taeye et al.

(10) Patent No.: US 11,363,866 B2
(45) Date of Patent: Jun. 21, 2022

(54) PROCESS FOR MAKING A LUGGAGE SHELL FROM SELF-REINFORCED THERMO-PLASTIC MATERIAL

(71) Applicant: Samsonite IP Holdings S.a r.l., Luxembourg (LU)

(72) Inventors: Arno De Taeye, Brakel (BE); Rik Hillaert, Oudenaarde (BE)

(73) Assignee: Samsonite IP Holdings S.a r.l., Luxembourg (LU)

( * ) Notice: Subject to any disclaimer, the term of this patent is extended or adjusted under 35 U.S.C. 154(b) by 73 days.

(21) Appl. No.: 14/185,183

(22) Filed: Feb. 20, 2014

(65) Prior Publication Data
US 2014/0166417 A1    Jun. 19, 2014

Related U.S. Application Data

(63) Continuation of application No. 11/629,938, filed as application No. PCT/EP2005/003899 on Apr. 13, 2005, now Pat. No. 8,663,531.

(30) Foreign Application Priority Data

Jun. 18, 2004  (DE) ............... 10 2004 029 453.4

(51) Int. Cl.
*A45C 5/02* (2006.01)
*B29C 51/46* (2006.01)
(Continued)

(52) U.S. Cl.
CPC .............. *A45C 5/02* (2013.01); *B29C 51/087* (2013.01); *B29C 51/145* (2013.01);
(Continued)

(58) Field of Classification Search
CPC ....... A45C 5/02; B29C 51/087; B29C 51/145; B29C 51/262; B29C 51/30; B29C 51/34;
(Continued)

(56) References Cited

U.S. PATENT DOCUMENTS 2,878,907 A * 3/1959 Kivett ................ A45C 5/02
                                              190/125
2,920,802 A * 1/1960 Cook ................. B60R 9/055
                                              224/328
(Continued)

FOREIGN PATENT DOCUMENTS

CN   1167429 A    12/1997
DE   3815064 A1   11/1989
(Continued)

OTHER PUBLICATIONS

Breuer, Neitzel, Ketzer, and Reinicke, "Deep Drawing of Fabric-Reinforced Thermoplastics Wrinkle Formation and Their Reduction," Polymer Composites, U.S.A., Aug. 1996, vol. 17 No. 4, p. 643-648.

(Continued)

*Primary Examiner* — Tri M Mai
(74) *Attorney, Agent, or Firm* — Dorsey & Whitney LLP

(57) ABSTRACT

Process of making a plastic component (1), in particular luggage shell, from self-reinforced thermoplastic material, to a plastic component (1) made of self-reinforced thermoplastic material and an apparatus for making such a plastic component, in particular luggage shell (7). The invention provides a new product and process for manufacturing same on the basis of self-reinforced thermoplastic material by means of the step of tensioning said material (lamina), at least partially tensioning said lamina during all follow-up component shaping and/or molding steps up to a release of a component pre-form shape from the remainder lamina, to form the component. The present invention allow the manufacturing of an ultra-light weight luggage shell (7) on the basis of using self-reinforced thermoplastic material, the manufacturing of same can be further enhanced by perma- (Continued)

nently tensioning said material during all manufacturing steps up to the final finishing of the product.

20 Claims, 21 Drawing Sheets

(51) Int. Cl.
| | |
|---|---|
| *B29C 51/08* | (2006.01) |
| *B29C 51/26* | (2006.01) |
| *B29C 51/30* | (2006.01) |
| *B29C 51/14* | (2006.01) |
| *B29C 51/34* | (2006.01) |
| *B29C 70/04* | (2006.01) |
| *B29C 70/54* | (2006.01) |
| *B29C 70/56* | (2006.01) |
| *B29C 35/08* | (2006.01) |
| *B29L 31/00* | (2006.01) |
| *B29K 23/00* | (2006.01) |
| *B29K 105/08* | (2006.01) |
| *B29K 77/00* | (2006.01) |
| *B29C 51/32* | (2006.01) |

(52) U.S. Cl.
CPC ............ *B29C 51/262* (2013.01); *B29C 51/30* (2013.01); *B29C 51/34* (2013.01); *B29C 51/46* (2013.01); *B29C 70/04* (2013.01); *B29C 70/541* (2013.01); *B29C 70/56* (2013.01); *B29C 35/08* (2013.01); *B29C 51/082* (2013.01); *B29C 51/085* (2013.01); *B29C 51/32* (2013.01); *B29C 70/545* (2013.01); *B29C 2793/009* (2013.01); *B29K 2023/12* (2013.01); *B29K 2077/00* (2013.01); *B29K 2105/08* (2013.01); *B29K 2995/0041* (2013.01); *B29L 2031/7418* (2013.01)

(58) Field of Classification Search
CPC ..... B29C 51/46; B29C 51/082; B29C 51/085; B29C 51/32; B29C 70/04; B29C 70/541; B29C 70/56; B29C 70/545
See application file for complete search history.

(56) References Cited

U.S. PATENT DOCUMENTS

| | | | | |
|---|---|---|---|---|
| 3,115,678 | A | 12/1963 | Keen et al. | |
| 3,136,398 | A * | 6/1964 | Platt | A63B 47/007 206/315.9 |
| 3,306,403 | A * | 2/1967 | Heitler | A45C 5/02 190/115 |
| 3,313,382 | A * | 4/1967 | Rosing | A45C 5/02 190/123 |
| D215,389 | S | 9/1969 | Samhammer | D3/292 |
| 3,470,928 | A * | 10/1969 | Schwartz | D03D 15/00 139/389 |
| 3,490,507 | A * | 1/1970 | Grashorn | B29C 70/22 383/109 |
| 3,497,041 | A * | 2/1970 | Samhammer | A45C 13/36 190/115 |
| 3,535,184 | A * | 10/1970 | Schwartz | B29C 66/4322 156/274.8 |
| 3,544,418 | A * | 12/1970 | Holtzman | A45C 5/02 156/242 |
| 3,660,150 | A * | 5/1972 | Cooper | D06N 3/0088 428/36.2 |
| D225,383 | S * | 12/1972 | Eisele | D3/292 |
| 4,061,817 | A * | 12/1977 | Maxel | A45C 5/02 156/245 |
| 4,201,612 | A | 5/1980 | Figge et al. | |
| 4,335,896 | A * | 6/1982 | Koffler | A45C 5/143 16/30 |
| 4,666,544 | A | 5/1987 | Whiteside et al. | |
| 4,703,519 | A | 10/1987 | Krenzel | |
| D298,486 | S * | 11/1988 | Jain | D3/292 |
| D299,589 | S * | 1/1989 | Uchiyama | D3/279 |
| 4,908,176 | A | 3/1990 | Kato | |
| 5,132,166 | A * | 7/1992 | Adams | B29C 70/345 428/212 |
| D331,663 | S * | 12/1992 | Roncato | D3/292 |
| 5,252,161 | A * | 10/1993 | Chang | A45C 5/02 156/196 |
| 5,376,322 | A | 12/1994 | Younessian | |
| D373,953 | S * | 9/1996 | Gale | D3/302 |
| D378,025 | S * | 2/1997 | Perelli | D3/318 |
| 5,637,330 | A | 6/1997 | Younessian et al. | |
| D390,703 | S * | 2/1998 | Haley | D3/323 |
| D391,762 | S * | 3/1998 | Ahern, Jr. | D3/302 |
| 5,843,492 | A | 12/1998 | McCorry | |
| 5,894,007 | A | 4/1999 | Younessian et al. | |
| D417,156 | S * | 11/1999 | Veyssiere | D9/552 |
| 5,988,417 | A * | 11/1999 | Cheng | B65D 1/0223 215/373 |
| D438,381 | S * | 3/2001 | Sijmons | D3/276 |
| 6,581,794 | B2 * | 6/2003 | Boukobza | B65D 1/0223 215/382 |
| D514,315 | S * | 2/2006 | Lai | D3/276 |
| 8,202,942 | B2 | 6/2012 | Li et al. | |
| 8,663,531 | B2 | 3/2014 | De Taeye et al. | |
| 9,403,341 | B2 | 8/2016 | Ward et al. | |
| 2003/0146543 | A1 | 8/2003 | Lebrun et al. | |
| 2004/0231941 | A1 | 11/2004 | Van Hoye et al. | |
| 2008/0261471 | A1 | 10/2008 | Chen et al. | |
| 2011/0253152 | A1 | 10/2011 | Lin et al. | |
| 2016/0303835 | A1 | 10/2016 | Ward et al. | |

FOREIGN PATENT DOCUMENTS

| | | |
|---|---|---|
| DE | 19652517 A1 | 6/1997 |
| DE | 29802922 U1 | 6/1998 |
| DE | 19717403 A1 | 10/1998 |
| DE | 10218144 A1 | 11/2003 |
| DE | 10259883 B4 | 6/2004 |
| EP | 1097794 A1 | 5/2001 |
| EP | 1814704 B1 | 8/2006 |
| EP | 2311629 A1 | 4/2011 |
| EP | 2576881 A2 | 12/2011 |
| EP | 2976208 B1 | 4/2017 |
| FR | 2148447 A1 | 3/1973 |
| GB | 1386953 A | 3/1975 |
| GB | 1593346 A | 7/1981 |
| JP | 05-301280 A | 11/1993 |
| JP | 05301280 A | 11/1993 |
| WO | 91/11324 A1 | 8/1991 |
| WO | 96/39892 A1 | 12/1996 |
| WO | 2004/028803 A1 | 4/2004 |

OTHER PUBLICATIONS

Prosser, Hine, Ward, "Investigation into thermoformability of hot compacted polypropylene sheet," Plastics, Rubber and Composites, England, 2000, vo. 29 No. 8, p. 401-410.

Riley, Hine, Bonner, War, "CURV(TM)—A new lightweight, recyclable material for automotive applications" Society of Automotive Engineers, U.S.A., 2002, IBEC 2002-01-2039.

Administration, "All-PP Composites Could Challenge GMT in Markets", Plastics Today, May 31, 2003, 2 pages.

Alcock, Benjamin, "Single Polymer Composites Based on Polypropylene: Processing and Properties", Extract from PhD. Thesis of Dr. Benjamin Alcock, May 2004.

Breuer, U. et al., "Deep Drawing of Fabric-Reinforced Thermoplastics: Wrinkle Formation and Their Reduction", Polymer Composites, Aug. 1996, vol. 17 No. 4, pp. 643-647.

Composite Solutions S.R.L., Italy, Opposition filed European Patent No. 1763430, dated Jul. 17, 2013, 34 pages.

Don & Low Limited, United Kingdom, Opposition filing European Patent No. 1763430, dated Jul. 16, 2013, 24 pages.

(56) References Cited

OTHER PUBLICATIONS

Nowacki, J et al., "Thermoforming of Reinforced Thermoplastic Stiffened Structure", Polymer Composites, Aug. 2000, vol. 21, No. 4, pp. 531-538.
Peijs, Ton, "Composites For Recyclability", Materials Today, Apr. 1, 2003, pp. 30-35.
Prosser, W. et al., "Investigation into thermoformability of hot compacted polypropylene sheet", Plastics, Rubber and Composites, 2000, vol. 29, No. 8, pp. 401-410.
Riley, Derek et al., "CURV—A new lightweight, recyclable material for automotive applications", Society of Automotive Engineers, Inc.—SAE Technical Paper 2002-01-2039, 2002, 6 pages.
Riley, Derek, "Self-Reinforced Polypropylene Composites for Automotive Applications", International Body Engineering Conference (IBEC) and Automotive & Transportation Technology (ATT) Conference, Paris, Jul. 9, 2002, 11 slides.
Robroek, Lucien M., "The Development of Rubber Forming as a Rapid Thermoforming Technique for Continuous Fibre Reinforced Thermoplastic Composites", Delft University of Technology Thesis, 1994, 266 pages.
Ward, I. M. et al., "The science and technology of hot compaction", Polymer 45 (2004), pp. 1413-1427.
Peijis, "Composites for recyclability," MaterialsToday, Apr. 1, 2003. pp. 30-35.

\* cited by examiner

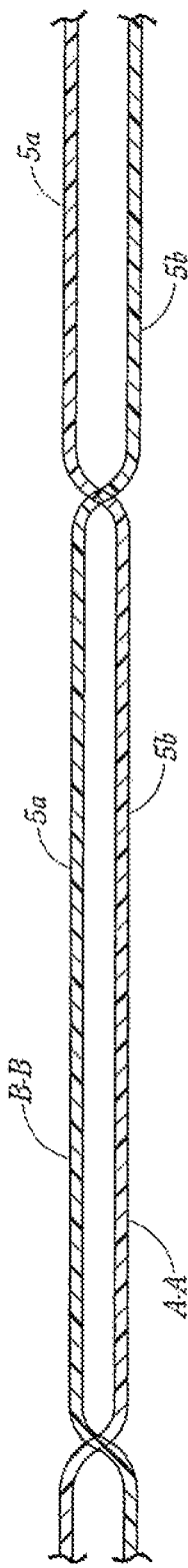
FIG. 3
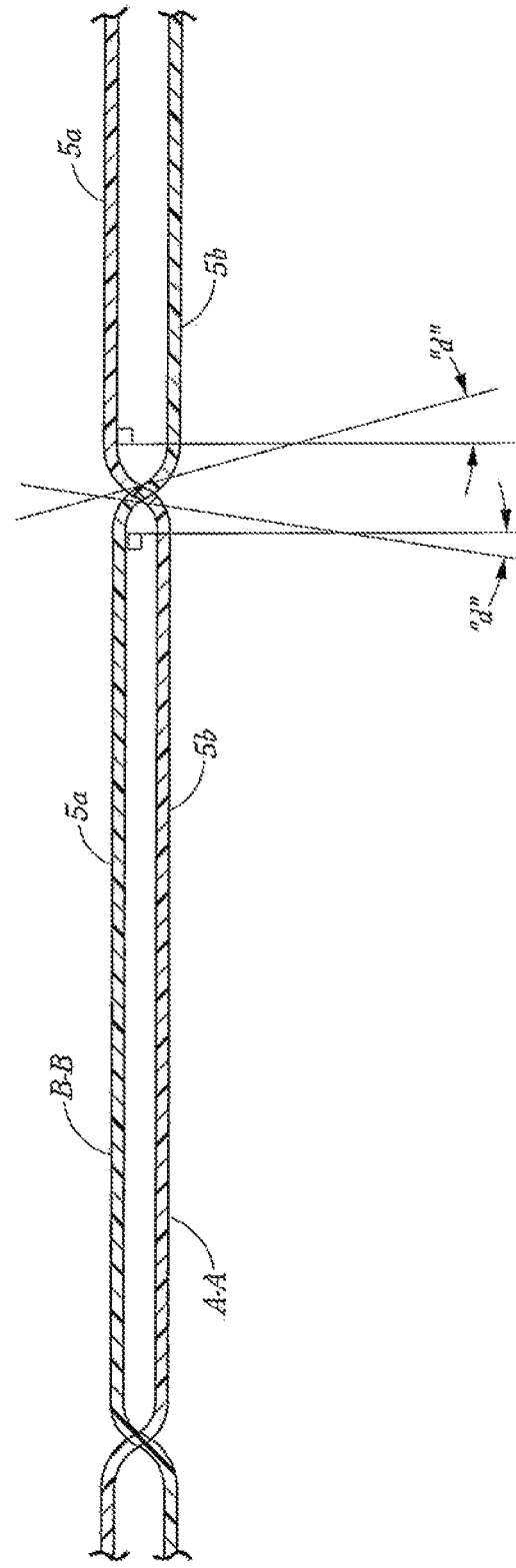
FIG. 3.2

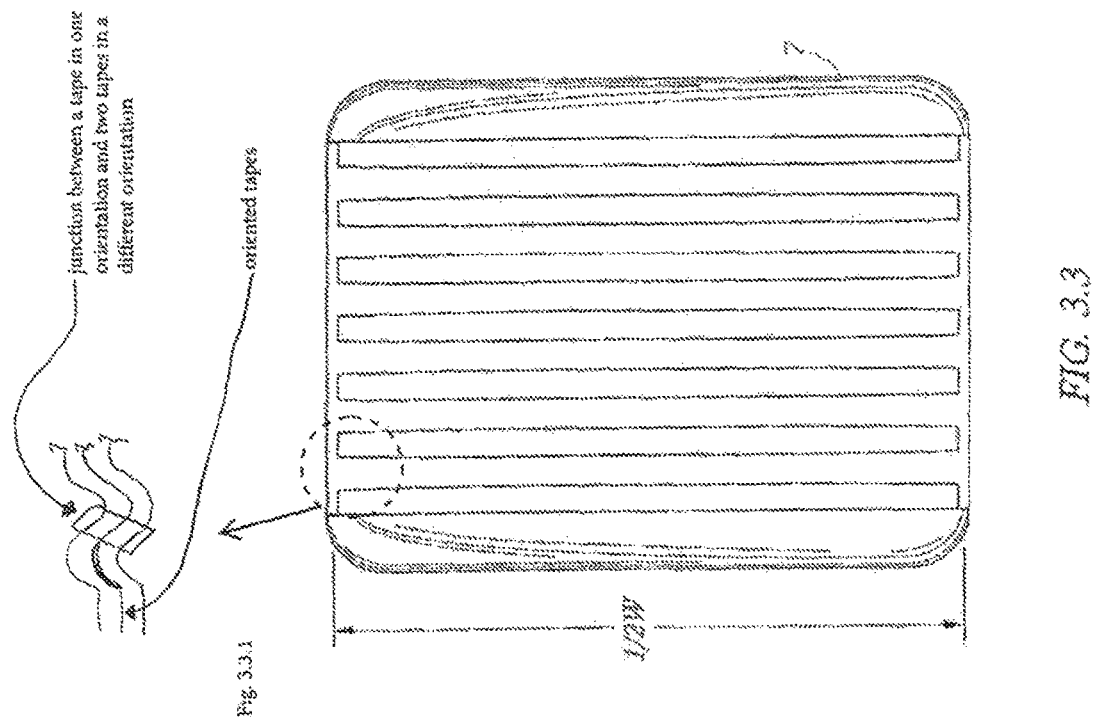
FIG. 3.3
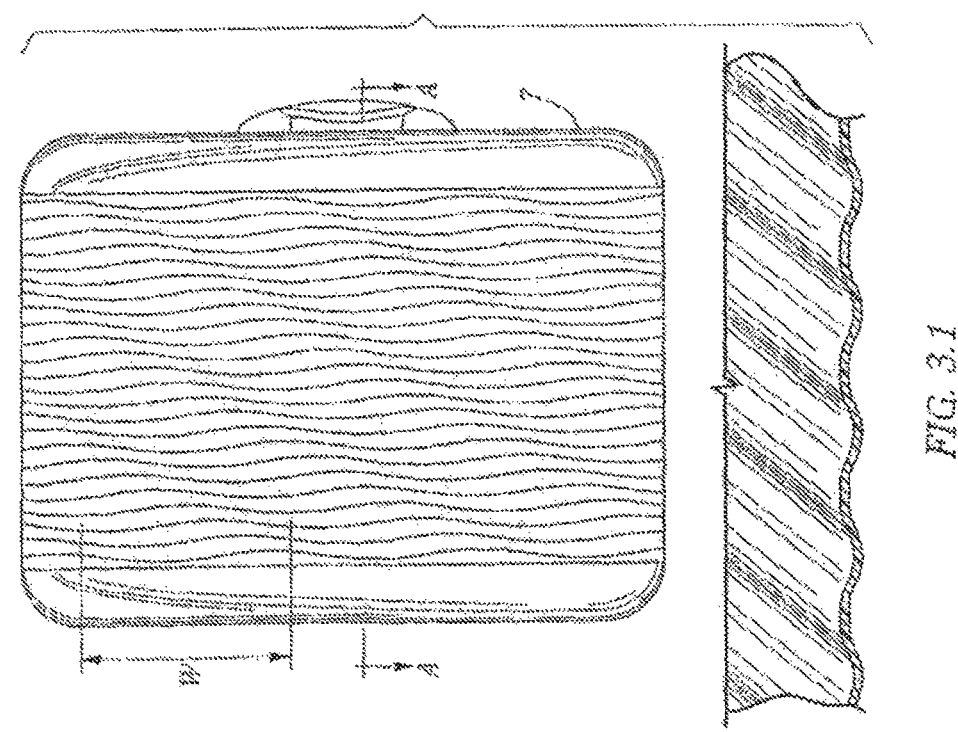
FIG. 3.1

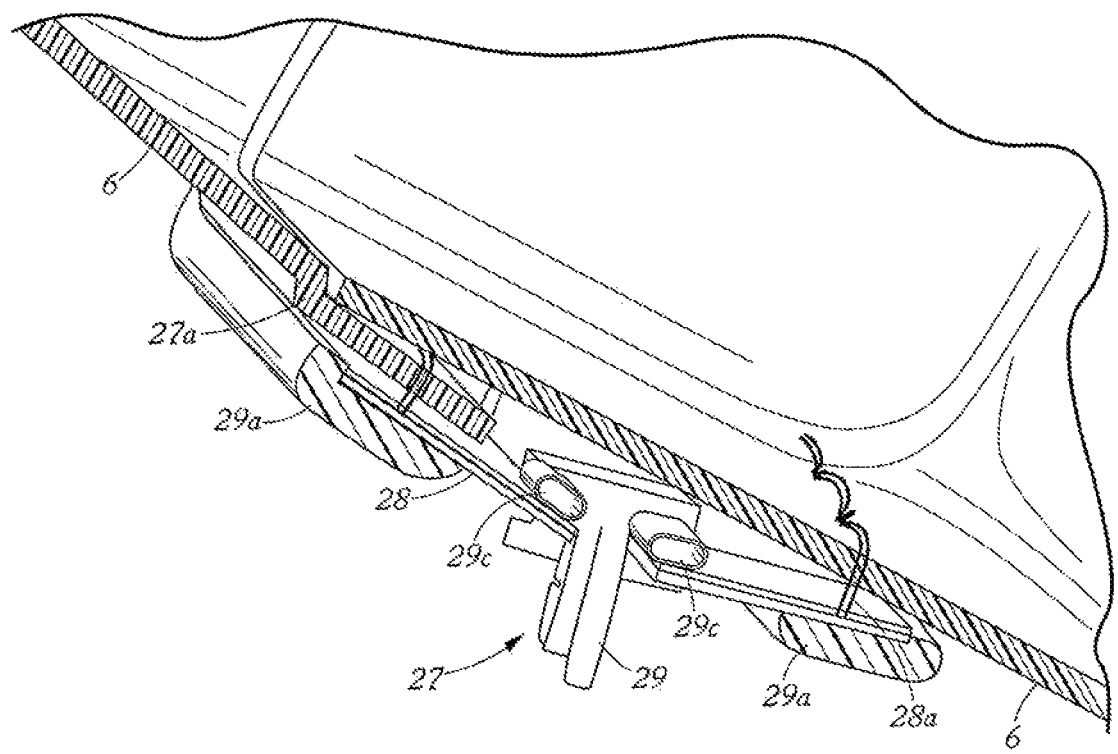
FIG. 6
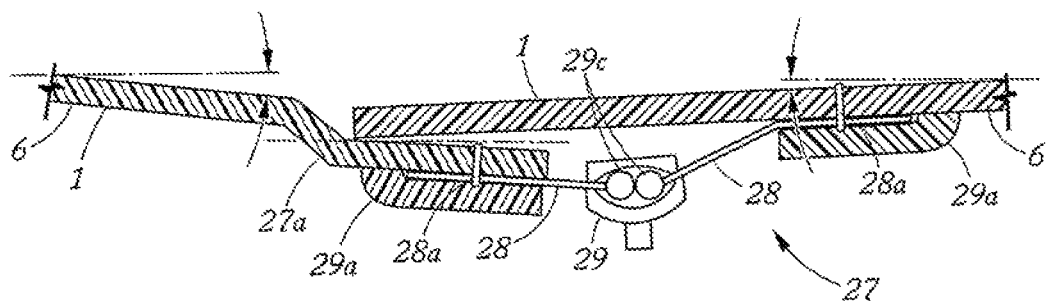
FIG. 6.1

PROCESS FOR MAKING A LUGGAGE SHELL FROM SELF-REINFORCED THERMO-PLASTIC MATERIAL

CROSS-REFERENCE TO RELATED APPLICATIONS

This application is a continuation application of U.S. patent application Ser. No. 11/629,938 filed on Apr. 25, 2007, now U.S. Pat. No. 8,663,531, and entitled "Process For Making a Luggage Shell From Self-Reinforced Thermo-Plastic Material", which application is the Section 371 of PCT International patent application No. PCT/EP2005/003899 filed on Apr. 13, 2005 and entitled "Process and Apparatus For Making a Plastic Component From Self-Reinforced Thermo-Plastic Material and Plastic Component Produced", which claims priority to German Patent Application No. 10 2004 029 453.4 filed on Jun. 18, 2004 and entitled "Process and Apparatus For Making a Plastic Component From Self-Reinforced Thermo-Plastic Material and Plastic Component Produced", which are all hereby incorporated by reference into the present application in their entireties.

FIELD OF THE INVENTION

The present invention relates to a process for producing a plastic component, in particular luggage shell, from self-reinforced thermoplastic material, a plastic component made of self-reinforced thermoplastic material and an apparatus for manufacturing such a plastic component, in particular luggage shell.

BACKGROUND OF THE INVENTION

In the past, several attempts have been made to produce plastic components having high physical strength and resistance against breakage and distortion while rendering the component made of such synthetic resin lightweight and easy to recycle. In particular, in the luggage industry, there is a demand for producing hard shell suitcases combining highest reliability and resistancy against impacts from outside with distortion-free behavior, favorable appearance and reduced weight to allow such luggage to be handled with ease and convenience.

Also, a couple of composite materials comprising laminates of synthetic resin such as thermoplastic resin and woven fabric have been applied.

Accordingly, from U.S. Pat. No. 5,376,322 a process of thermo-forming a cloth covered shape from a preform is known for producing luggage shells by pressure laminating a layer of cloth fabric to one surface of a thermoplastic substrate which subsequently undergoes a press forming process in a mold press with a specific focus on the forming of the corner areas. Still difficulties occurred, however, to ensure smooth corner areas to be produced, in particular when the radii of the corners or of the intersections between main surfaces of the product are desirably small. Moreover, further weight reduction in combination with increased strength is desirable.

Moreover from U.S. Pat. No. 5,755,311 a method of making hard side shells for luggage using a pressure differential molding process and applying an integrally formed frame about a thin thermoplastic hollow shell is known.

SUMMARY OF THE INVENTION

Based on the consideration that a high impact, low weight sheet material made of synthetic resin such as thermoplastic material can be produced on the basis of pre-stretched oriented strands of polymeric fibers embedded in a matrix of softer material of the same or similar type, EP 0 531 473 B1 provides a process and material in which an assembly of oriented polymeric fibers is maintained in intimate contact at an elevated temperature so that outer areas of the oriented polymeric fibers melts and said fibers are subsequently compressed so as to produce a coherent polymer sheet. According to said method and material, the oriented polymeric fibers, preferably comprising thermoplastic materials of polyolefin and, in particular, polypropylene or other crystalline or semi-crystalline materials and can be arranged as uni-axially aligned bundles or twisted bundles of fibers or as a mat of interwoven bundles depending on the later field of application.

A similar method for reinforcing an article by using tapes, film or yarns of drawn thermoplastic material is known from WO 2004/028803 A1 using polyethylenes (PE) or polypropylenes (PP) in a co-extrusion process, followed by stretching and cooling down. Finally, the positive properties of self-reinforced polypropylene, i.e. polypropylene reinforced with oriented polypropylene fibers (so-called "all PP" composites) in terms of recyclability, strength and stiffness are explained in greater detail in "Composite for Recyclability" by John Peijs, Materials Today April 2003, pages 30 to 35.

Based on that existing knowledge of self-reinforced thermoplastic material, in particular self-reinforced polypropylene, it is an objective of the present invention to overcome the difficulties to produce articles on the basis of self-reinforced thermoplastic material having a high degree of form change and comprise areas of high-grade deformation work, for example deep luggage shells, which is normally difficult in view of the high tensile strength and form change resistance of the self-reinforced thermoplastic material containing that stretched oriented strands or tapes, for example of PP or other crystalline or semi-crystalline thermoplastic material which can be pre-stretched prior to forming woven mats or other foil material from such tapes, films or yarns.

Thus, it is an objective of the present invention to provide a process of making a plastic component, in particular luggage shell, from self-reinforced thermoplastic material allowing the formation of highly durable but extremely lightweight components such as specifically deep luggage shells in a cost efficient manner paying particular attention to the smooth formation of corner regions and intersection areas between main surfaces of the component.

Moreover, it is an objective to provide such a plastic component, in particular luggage shell, formed from self-reinforced thermoplastic material allowing to considerably increase the ratio of depths to the length and/or width of such a component so as to be able to support high loads or weights with a minimal net weight of the component, in particular luggage shell.

Moreover, it is an objective of the present invention to provide an apparatus for making a plastic component, in particular luggage shell, comprising areas of high degree of form change which allows the production of three-dimensional plastic components having a high ratio of depths to widths or lengths of the product on the basis of machinery and tooling which has already been widely used in conventional systems showing such apparatus to be designed with ease and at relatively low costs, also with respect to the operation of such apparatuses.

Regarding the process aspects, according to the present invention, the afore-indicated objective is performed by a process having the features according to the present disclosure. Preferred embodiments of such processes are laid down in the related dependent claims.

Accordingly, the present invention performs a process which combines aspects of thermo-forming of polypropylene laminas with that one of deep-drawing of metal, in particular light metal sheets so as to develop a process which allows deep-drawing of self-reinforced thermoplastic materials, in particular having oriented strands of polypropylene or other crystalline or semi-crystalline thermoplastic resin allowing the formation of extremely lightweight components, such as luggage shells, having areas of high-grade form change, in particular with respect to the corner regions and intersection areas between main surfaces of such components which, so far, due to the difficulties experienced in press-forming self-reinforced thermoplastic mats or other sheets of thermoplastic material could not be molded in practice.

Thus, components, in particular luggage shells with substantial weight reduction compared to conventional hard side cases can be manufactured. In particular, woven self-reinforced polypropylene material will be used to manufacture such components, in particular shells by means of a press forming technology designated also as "compressed tech" technology.

An essential aspect of the present invention is the at least partially tensioning of the self-reinforced composite of thermoplastic material during all forming, in particular press forming and shaping steps such as deep-drawing of said material so as to be able to create components, in particular luggage shells having a high depth to surface ratio. Accordingly, all "critical" strands (tapes) and fibers, i.e. extending through areas of high-grade deformation such as corner regions should be kept tensioned during the entire process, irrespective of compression forces to arise in such areas during the press forming process.

With respect to the plastic component, in particular luggage shell, the above objective is performed by the features according to the present disclosure with preferred embodiments thereof being laid down in the related dependent claims.

Prior to any shaping or molding process, preferably the self-reinforced thermoplastic material (lamina) is lined with woven or knitted fabric, preferably by heat-bonding in a continuous inactive process with the further press-forming of the desired plastic component.

There is also the option to dispose multiple layers of the molecularly oriented strands contained in a respective layer of self-reinforced thermoplastic material under a certain angle to each other, in particular disposing neighboring layers crosswise which leads to further improved unilateral strength and quasi-anisotrop strength and bonding properties of the final product.

It is also possible to form a composite body or component such as shell comprising at least the self-reinforced thermoplastic material combined with other lining or in a sandwich structure, i.e. using a cell plastic or a lining made of dense cellular plastic material which need not to be a thermoplastic.

Regarding the apparatus for making a plastic component, in particular luggage shell, from a self-reinforced thermoplastic material, the above objective, according to the present invention, is performed by the features according to the present disclosure, while preferred embodiments of said apparatus are laid down in the further dependent claims.

Accordingly, the present invention allows the manufacturing of an extremely thin but durable, lightweight and distortion-resistant component, in particular luggage shell, having areas of high degree of form change such as relatively sharply bent curves and bends including corner areas of relatively low radius without wrinkles being produced.

This can lead to a new generation of ultra-lightweight luggage based on synthetic resin.

By press forming, in particular deep-drawing of self-reinforced thermoplastic composites (SRTC), a new type of material is created which may be based on polypropylene as a base material but also other crystalline or semi-crystalline material such as nylon (which is a registered trademark) can be used. Preferably, such self-reinforced thermoplastic composite materials (SRTC) are made with either re-softened areas (by intermediate heating) before press forming a laminate or under use of (co-extruded polypropylene) tapes, these tapes, strings or yarns are stretched and, after an in particular low temperature or cold stretching process, comprise a highly oriented core with a thin layer of same or similar material around the core having a lower melting point.

Preferably, the tapes are woven into a fabric which can be compacted or a multi-layer component can be combined therefrom considering that at a certain temperature the outer film surrounding the stretched core is melting and by pressure molding the fabrics can be compacted to a plate or multi-layer lamina.

While polypropylene (PP) tapes are less stiff than organic fibers and their visco-elastic behavior allows for more deformation than plastic or thermoplastic composites such properties can promote the deep-drawing of these materials.

In order to avoid the shortcomings of attempts of deep-drawing SRTC with a considerable degree of form change, the problem of heat shrinkage of the stretched tapes under elevated temperature of more than 100° C. has been solved considering that a successful deep-drawing process would need to heat the SRTC lamina up to about 170° C.

The invention preferably keeps all critical tapes, i.e. tapes at critical positions with respect to the high degree of form change of the product during the deep-drawing or press forming process under tension (creation of tensile force) during the entire process. This tensioning may occur passive by fixing the thermoplastic sheet material in its edge areas and proceeding to subject same to a press-forming, such as deep-drawing process, so that the lamina itself creates those tensile forces or may be an actively controlled tensioning by introducing (steering) respective tensile forces applied to the lamina (potentially additionally) from outside.

According to the present invention, a sheet clamping device is used which takes all tapes clamped around the entire circumference and provides the opportunity to control and passively or actively steer the tension in the tapes according to the desired process. Said controlling or steering of the tensioning of the most critical tapes can be force-driven, position-driven, or can be a combination thereof.

Moreover, the present invention preferably avoids compression forces in the corners of the product, in particular luggage shell, to occur which would counteract or eliminate the tension in the tapes, strings or yarns and could cause wrinkles in the high degree form changed corner areas.

Accordingly, the present invention provides means that can give an extra-controlled deformation at the corner areas to keep all tapes under tension and/or guide potential wrinkles to avoid them to slide into the final product. Preferably, this is done by pre-stretching or steered stretching and tensioning during the press forming, in particular deep-drawing process.

Preferably, the apparatus design of the respective machinery may use the press of two independently moving mold halves (cavity and core) or may apply an independent frame that holds auxiliary mold surfaces or the like, operating through holes in the upper or under gripping jaws. Also, a blow-forming step, i.e. a pre-stretch prior to a deep-drawing activity by a blow-forming step beforehand may be used.

Preferred embodiments are laid down in the further sub-claims.

BRIEF DESCRIPTION OF THE DRAWINGS

In the following, the present invention is explained in greater detail by means of several embodiments thereof explained hereinafter in conjunction with the accompanying drawings, wherein:

FIG. 3 schematic cross-sectional views of the luggage shell surface according to lines "A-A" and "B-B" of FIG. 2 which are shown in FIG. 3 in a superimposed view to elucidate the surface pattern;

FIG. 3.1 a plan view of an alternative stiffening pattern for the base wall of a luggage shell;

FIG. 3.2 perspective, cross section scaled up to elucidate the stiffening pattern of FIG. 3.1;

FIG. 3.3 a plan view of a further alternative stiffening pattern similar to that shown in FIG. 3.1;

FIG. 3.3.1 is an enlarged view of FIG. 3.3.

FIG. 6 a detail (cross-section) of a zipper closure detail of a luggage case, the schematic view;

FIG. 6.1 a detail according to FIG. 6 as schematic cross sectional line drawing;

DETAILED DESCRIPTION

Figure 1:
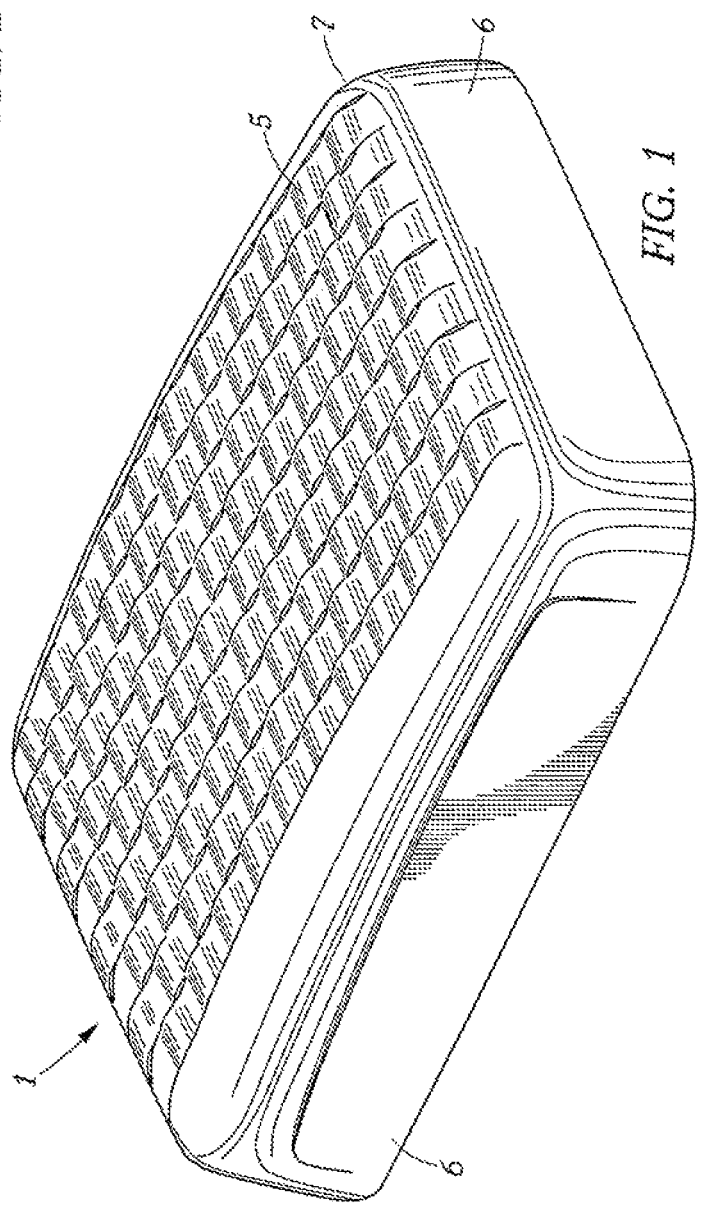
FIG. 1 a luggage shell according to a first embodiment of the present invention in a perspective view from outside.

FIG. 1 shows a shell 1 according to the invention, in this case a luggage shell. Here the edge around the perimeter of the upstanding sidewalls 6 has been cut to remove the excess material, or offal, left from the processing. The shell is deep drawn, that is, the sidewalls 6 with respect to a base wall 5 have a depth dimension that is quite large relative to previous shells made from the preferred self-reinforcing thermoplastic sheet. More particularly, this depth dimension is quite large relative to the length or width dimension of the overall shell 1. This relationship can best be express as a ratio of the smaller of either the length or the width dimension. Preferably, the shell has a depth of up to half of a width dimension of the shell with a preferred ratio being in the range of about 0.2 to 0.3. The homogenous thickness of the shell material preferably amounts to as low a 1 mm (or 0.8 mm) up to 3 mm, preferably about 2.5 mm and should normally be in the range of 1 to 2 mm. The preferred luggage shell is made from self reinforcing plastic known commercially under the trademark "Curv" from BP Amoco, although other thermoplastic materials having similar physical, chemical, and thermo processing characteristics will work as well, such as the Pure, available from Lankhorst. The self-reinforcing thermoplastic material comprises, in particular uni-aligned, twisted (in bundles) or woven tapes, strings or yarns of preferably up to ten (potential more or less) layers containing such molecularly oriented strands in conjunction with molecularly unoriented thermoplastic or similar matrix material. By disposal in predetermined patterns of subsequent layers or different layers unidirectional strength properties can be assured with the pre-tensioned strands extending inclined to each other in the same or in different layers of the shell.

As shown in the figures, the shell's upstanding wall has a dimension perpendicular to a base wall 5 of about 110 mm for a typical 50 cm case. The ratio of length to width is preferably between 1 and 2, in particular between 1 and 1.4. The shell has integrally formed corner regions 7. The width of the shell for such a luggage case thus would usually be around 36 cm. Such dimensions result is a shell that, when paired with a similarly proportioned shell by a simple frame or zipper closure at their mating edges, provides a remarkably light luggage case with a substantial volume in which to pack a traveler's needs. The upstanding wall 6 of each such shell 1 should thus be as deep as possible, given the difficulties in forming the self-reinforcing materials contemplated by this invention. This perpendicular dimension for such a luggage case could be as little as about 80 mm and still be considered "deep drawn", especially where the radius of the self reinforcing material in the corner regions is 60 mm or less.

The process and apparatus disclosed herein can make a range of shell sizes, of course. But the most advantages of this invention preferably occur for deep drawn shells where the ratio of the perpendicular dimension discussed above to the smaller of the width or length dimension is preferably less than about 0.3, for shells with corner radiuses of preferably less than about 60 mm.

Figure 2:
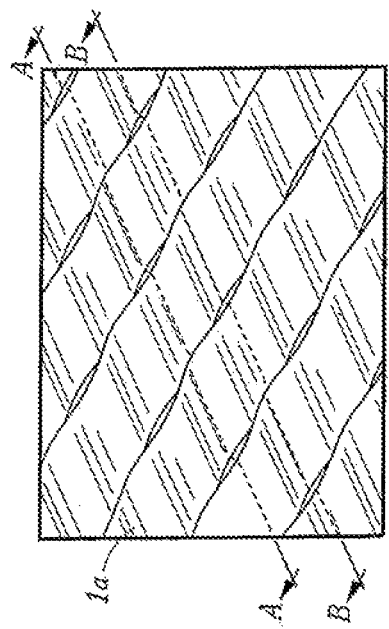
FIG. 2 a detail of the surface of the luggage shell of FIG. 1 ("detail C") to elucidate the surface pattern or surface design of the luggage shell of FIG. 1.

FIG. 2 is a close-up perspective view showing a small section of the three dimensional stiffening pattern impressed into the outer main shell face 1a of the base wall 5.

Self reinforcing plastics have remarkable strength, impact and toughness characteristics which make them attractive for making very lightweight structures, especially deep drawn shells of the type described. Very thin sheet materials in the range of 12 to 15 mm thick provide excellent physical characteristics and light weight. Unfortunately, a luggage shell should provide resistance to distortion especially at its base wall to prevent crushing. A thicker starting sheet would help, but at greater cost and weight.

The base wall 5 of the inventive shell has a pattern of alternating concave and convex areas 5a, 5b (see FIG. 3) to provide remarkable structural stiffening by increasing the beam strength or increasing the bending moment to resist bending in all planes perpendicular to the base wall. Note that the figures show a complex pattern of alternating concave and convex rectangular areas extended in a two-dimensional surface plane of the base wall 5. Of course, the concave/convex pattern is three-dimensional. These areas are actually the visible result of impressing a series of undulating strips into the base wall of the shell during deep drawing. These strip patterns of continuous undulations are substantially to one another, but in fact curve slightly as will be detailed to that none form parallel edges to one another. Also, adjacent undulations are offset from one another by about the longitudinal dimension of one of the rectangular shapes or areas. Of course, other, preferably regular alternating concave/convex patterns, might be chosen.

FIG. 3 is a detail comparing the center line of general cross sectional shape of the base wall at section AA with the center line of the cross sectional shape of an adjacent Section BB of FIG. 1.

This offset pattern of undulating shapes is not only esthetically pleasing, it also results in remarkable stiffness or resistance to bending forces that would tend to distort the shell's base wall both parallel to its longitudinal dimension, that is parallel to the longitudinal direction of the undulating strip pattern, as well as perpendicular to its longitudinal dimension. With regard to longitudinal stiffness, note that the lines AA and BB of FIG. 3 each represent a line going down the center of the self reinforcing material at the Section planes AA and BB of FIGS. 1 and 2. Although the edges of the undulating strip patterns appear to be generally straight or, as will be detailed, gently and smoothly curving lines, these edges in fact jog sidewise (i.e., displaced laterally) at each undulation. This is caused by the draft angle "d" (that is the angle of a mold surface relative to the direction of movement of the mold in a press) and the thus corresponding molded edges used to form the lateral "walls" of each rectangular shape in the pattern. This draft angle, even at the relatively steep angle in the range of seven degrees, results in multiple or repeating offsets of the slight distance shown enlarged in FIG. 3. Clearly the rectangular indentations and protrusions formed by this pattern move much of the self reinforcing material away from the neutral axis, much like a series of ribs extending across the width of the base wall would. But such ribs do nothing to stiffen such a ribbed panel against bending parallel to such ribs. Here however, the jogging or repeated offset created by the draft angle as detailed above also places some self reinforcing material away from the neutral axis parallel to the undulations, tending to resist bending along these lines as well. Put another way, the pattern detailed above creates a series of small walled coffers with stiffening, upstanding walls despite the fact that nowhere on the panel is the thickness of the self reinforcing sheet thicker than its nominal starting dimension (mentioned above to be, preferably in the range of 12 mm to 15 mm).

FIG. 3.1 shows and alternative form of stiffening pattern formed in the base wall of the preferred luggage shell. Here continuously curving edges are molded to define adjacent concave and convex elongated grooves and ribs as can be seen in the scaled up perspective section drawing FIG. 3.2. These edges visibly curve continuously in a characteristic wavelength "w" in the general plane of the base wall. The adjacent edges are offset to one another in a longitudinal direction by a substantial portion of this characteristic wavelength. In the example shown in here, this offset is about 20% of the wavelength, thus giving a stiffening effect to resist bending along the longitudinal direction (that is, parallel to the grooves and ribs) while giving a softer, potentially more esthetically pleasing pattern. FIG. 3.3 shows a further variation. Here the longitudinal edges are shown in white and the alternating grooves and ribs separated by these edges are shown in black, and has a typical cross sectional shape similar to that shown in FIG. 3.2. Each of these longitudinal edges curve continuously in a very long characteristic wavelength "w", which in this embodiment longer than the length dimension of the shell. Adjacent edges are offset to one another about one half this very long characteristic wavelength. While less pronounced, this pattern can also provide some stiffening to resist bending along the longitudinal dimension.

Figure 4:
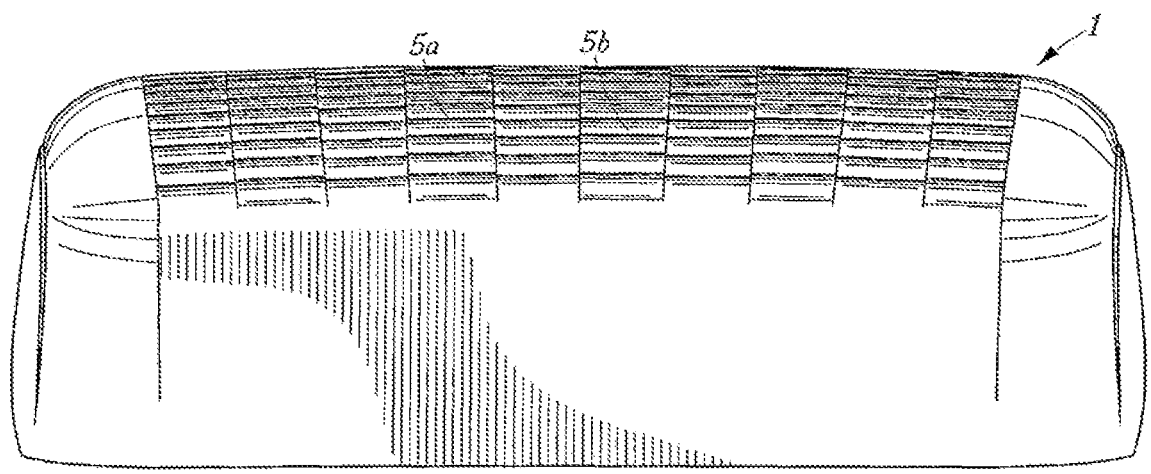
FIG. 4 a view along the length dimension of the luggage shell of FIG. 1.

FIG. 4 is a view along the length dimension of the shell in FIG. 1.

As mentioned above, the vertical lines visibly defining the offset undulating strip patterns are, except for that at the longitudinal center of the base wall, are all actually slightly curving. This curve is small, that is the radius of curvature is quite large, on the order of a few meters. Not only does this curving help esthetically, but also prevents the series of small upstanding jogged walls from forming "fold line", or line along which the base wall can easily bend.

Figure 5:
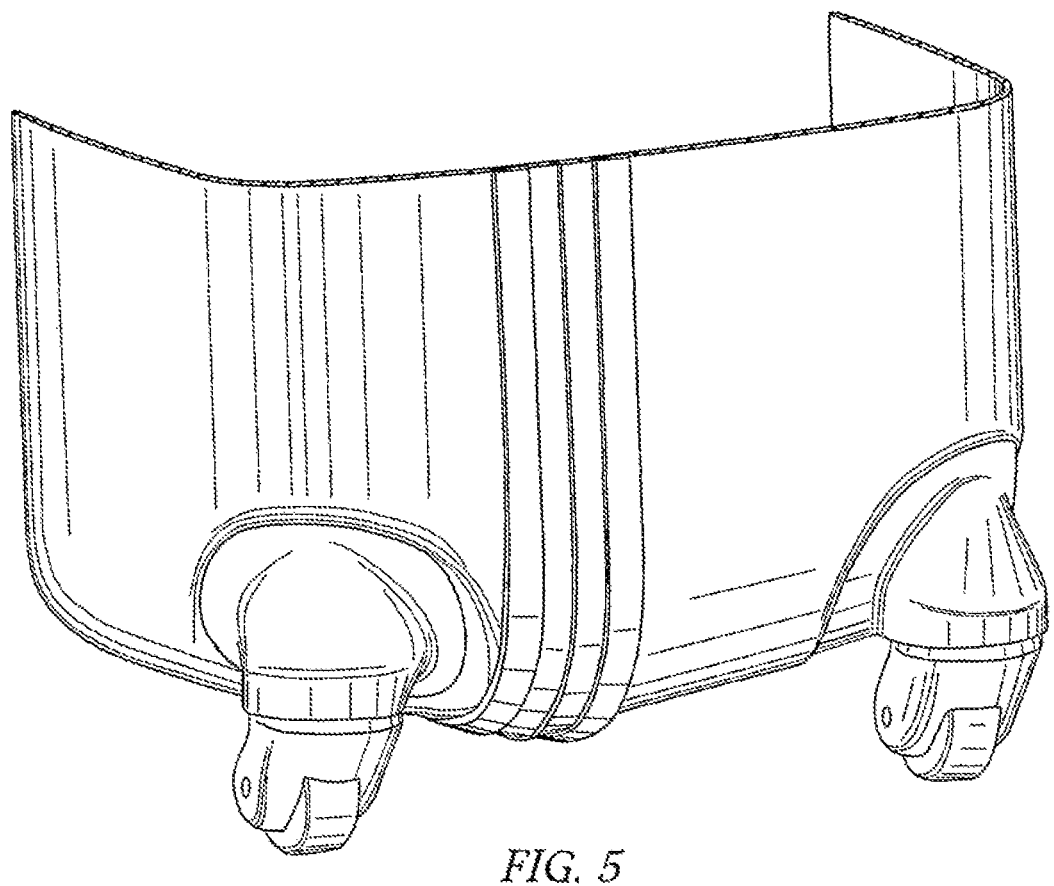
FIG. 5 a partial perspective view of a luggage case using luggage shells according to the present invention in a view from a lower corner of the luggage case.

FIG. 5 is a partial perspective view of a luggage case using shells according to the present invention, being a view from the lower corner of the luggage case.

Here one can see that a luggage case can be made by mating two similarly shaped, inventive shells. The adjacent edges are selectively attached by a zipper 27 or slide opener track as will be detailed. Note the caster wheel mounts 25 are at the shell corners, in particular at the very corners giving stability much like the casters on the ends of an office chair's legs (of course, they can also be accommodated in recessed areas). As is derivable, the shell halves can have quite different depths with the mating area offset with respect to the corner/castor positions.

FIGS. 6, 6.1 is a cross-section of the zipper closure detail.

One shell perimeter edge has a step 27a which goes substantially all the way around its perimeter and is sized to just engage or receive the corresponding perimeter edge of the other shell 1. This step 27a is preferably formed with a draft angle α approaching zero. The rest of the upstanding wall portions are conveniently formed with a draft angle β of about seven degrees. Such a draft angle β permits the opposed mold surfaces of the male and female molds used to deep draft the shells 1 to apply sufficient molding pressure perpendicular to the shell surfaces to properly pressurize the self reinforcing material and keep it properly consolidated and provide a please surface finish. For this stepped portion, a special female mold has a perimeter portion 18 adjacent the mold edge which has almost no draft angle (i.e., a draft angle of about zero degrees). Similarly, the corresponding mold surface 19 of the male mold has almost no draft angle. Compaction and shaping forces are provided by an elastomeric element 20 in the male mold preferably made of a rugged, temperature resistant silicone rubber or the like. This element expands radially outwardly when it is squeezed between the male mold support and the rest of the male mold, thus providing the compressive pressure on the stepped edge portion of this shell (see corresponding FIGS. 26, 27)).

The zipper tape 28 on the left of FIG. 6 is stitched at 28a to this stepped edge, while the zipper tape 28 on the right is stitched at 28a to the other shell edge such that when a zipper slider 29 is operated to close the zipper 27, the shells 1 are firmly held together in the telescoped position with their edges firmly overlapping. Preferably, each zipper tape 28 has an extruded flap 29a adhered along each outer edge thereof which can be pushed out of the way by the sewing machine foot when the zipper tape 28 is being attached. This extrusion snaps back into place to both hide the stitch line as well as help seal the resulting perforations against precipitation. Associated zipper coils are designated by 29c.

Figure 7:
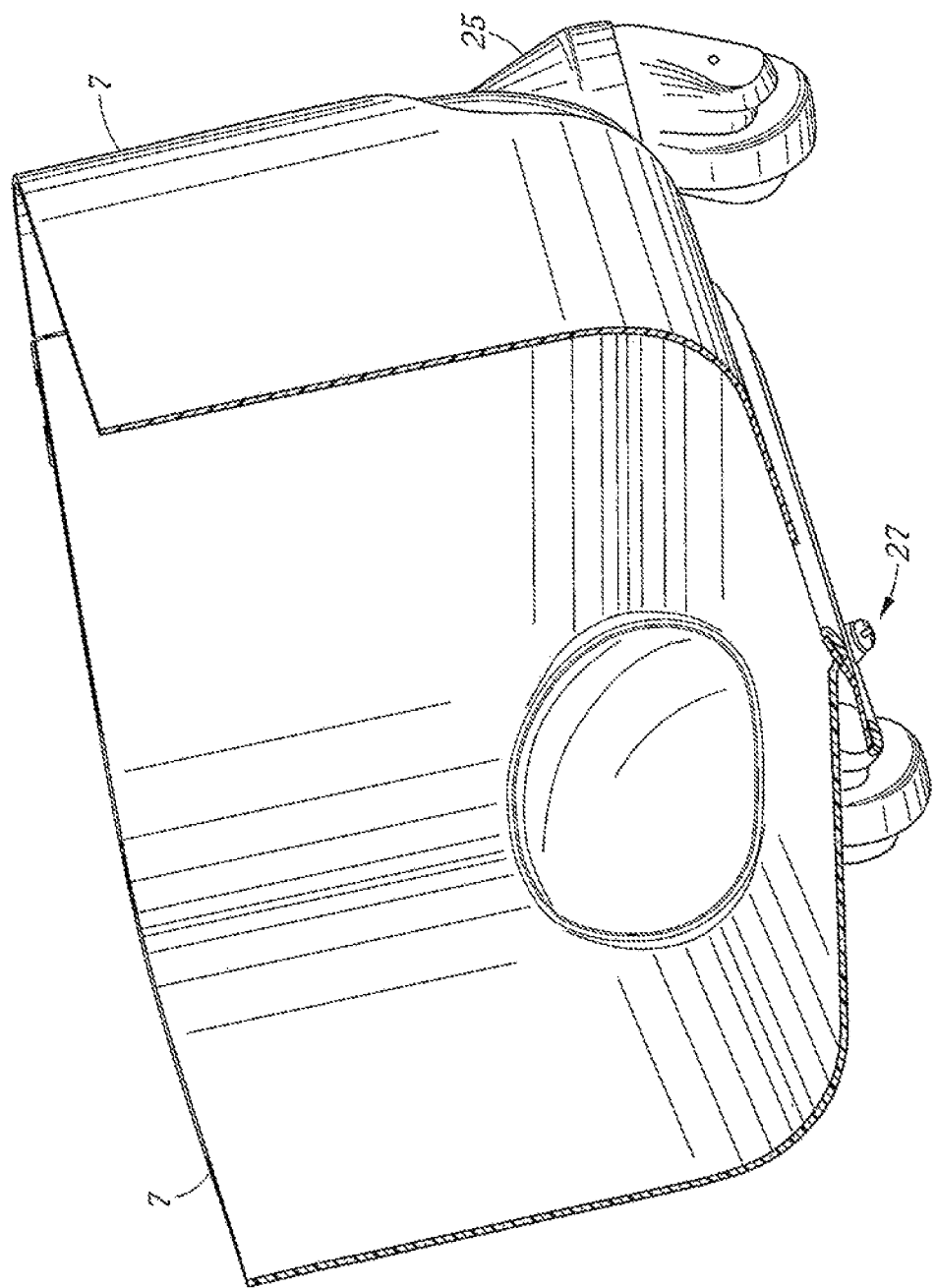
FIG. 7 a view similar to FIG. 5 but showing the interior surface of that portion of a luggage case in schematic view.

FIG. 7 is a view similar to FIG. 5 but showing the interior surface of that portion of the luggage case.

The lower corner (when the case is erect on the attached cast wheels) has a substantial indentation for receiving an otherwise conventional wheel mount. Screw fasteners (not shown) pass through holes drilled through the self-reinforcing polymer sheet material in these indentations to fasten the wheel mount to the shells. The luggage case shown, even including four wheels and appropriate carry and wheeling handles, could way as little as 2.2. Kg for a conventionally sized case of about 50 cm length.

Figure 8:
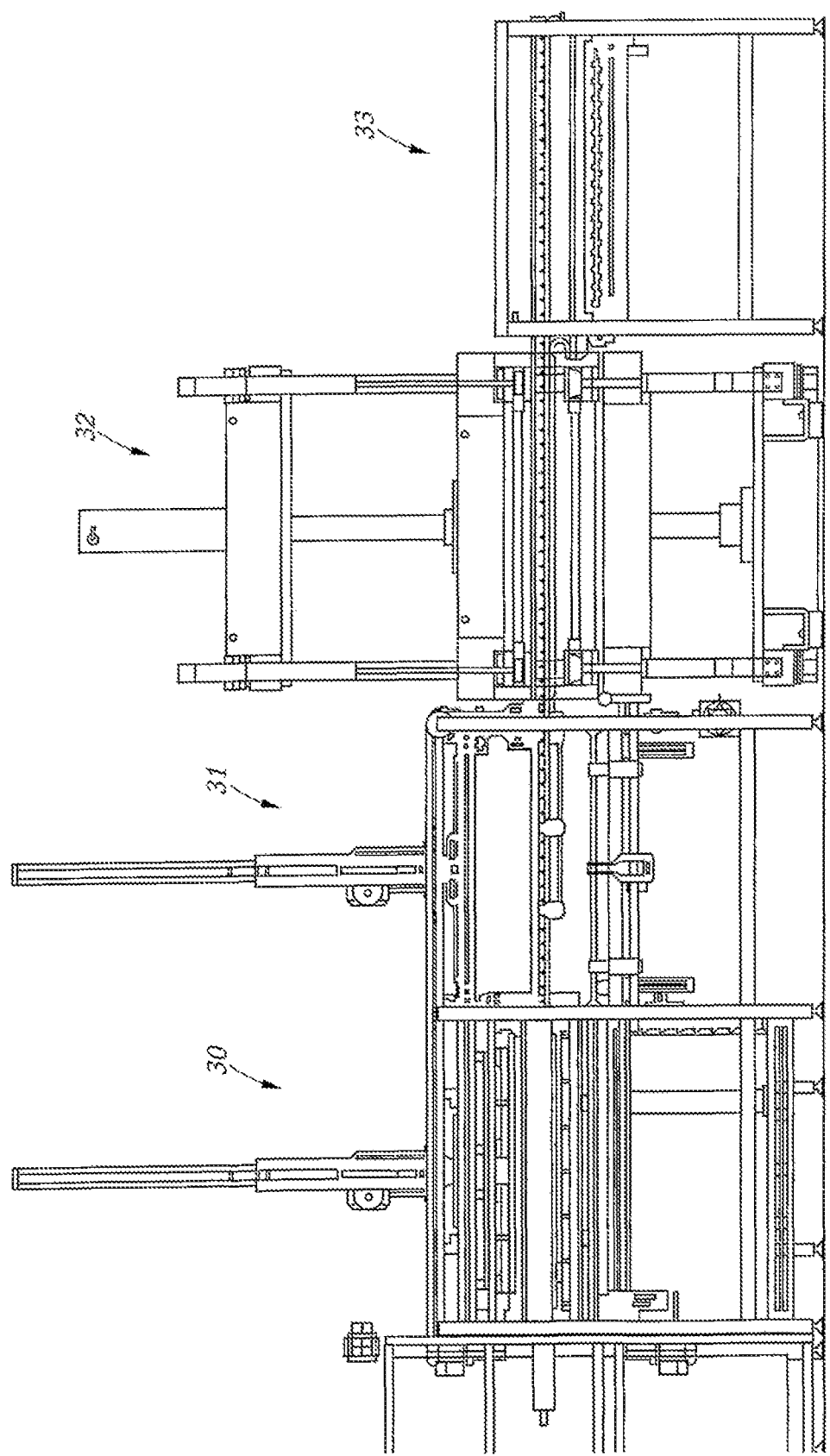
FIG. 8 a production machinery for conventional luggage shells as conventionally used, schematically.

FIG. 8 shows a conventional production machinery for making a type of luggage shell.

This machinery is used to make basket weave textile covered polypropylene luggage shells. I consists of (from left to right), a heating station (pre-heating) 30 that warms the pre-laminated textile and polymer sheet perform to proper processing temperature. Next is a station 31 for placing a lining material such as a knit fabric, on the next sheet to be pressure formed. The press section 32 to the right receives the polypropylene laminate and forms it into a shell shape between matched mold forms. The component removal station is designated with reference numeral 33.

Figure 9:
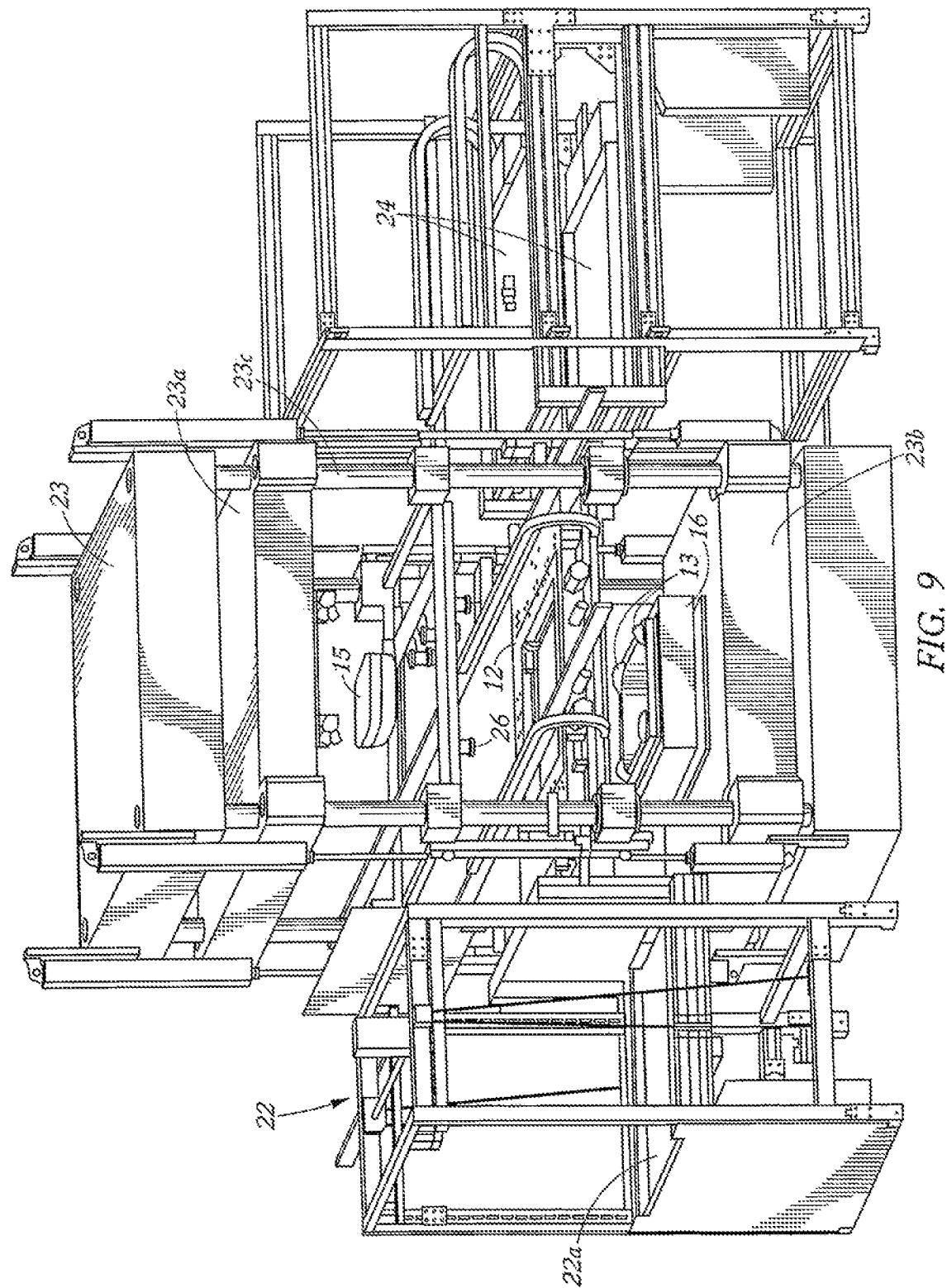
FIG. 9 an embodiment of an apparatus for manufacturing luggage shells according to the present invention.

FIG. 9 shows schematically the apparatus according to our invention for making a shell 1 as in FIG. 1.

The FIGS. 10 to 15 show this apparatus of FIG. 9 in its various operational stages: The apparatus includes, from left to right, is a lining textile dispenser 22 which receives stacks of knit textile cloth for placing on temperature conditioned sheets of self reinforcing polymer, the press 23, and the radiant heater 24. A supply of sheets of self-reinforcing polymer is behind the press. The textile lines (not shown) are disposed on a tray 22a. The deep-drawing press comprises upper and lower tables 23a, 23b which are movable relative to each other, i.e. the upper table 23 supporting the upper or male mold 15 of the deep-drawing tooling 14 descends toward the lower or female mold 16 along and guided by column frame 23c. Grippers 26 hold the corners of the lining fabric or textile material to be bonded to a sheet (lamina) of self-reinforced thermoplastic material to be supplied into the press 23 from the back. A sheet gripping rack 12 (shown in more detail in FIGS. 22 to 24) controllably holds or stretches each warmed sheet from the sheet supply to a position between the upper male shell mold tool 15 (shown with its support table removed for clarity) and the lower, female mold 16. The radiant heater support includes upper and lower radiant heater arrays 24. These arrays 24 slide simultaneously out of the support rack 12 to heat both sides of the self-reinforcing polymer sheet while it is being gripped and held or stretched by the gripping rack 12 between the shell mold tools 14 (upper and lower deep-drawing molds 15, 16).

Figure 10:
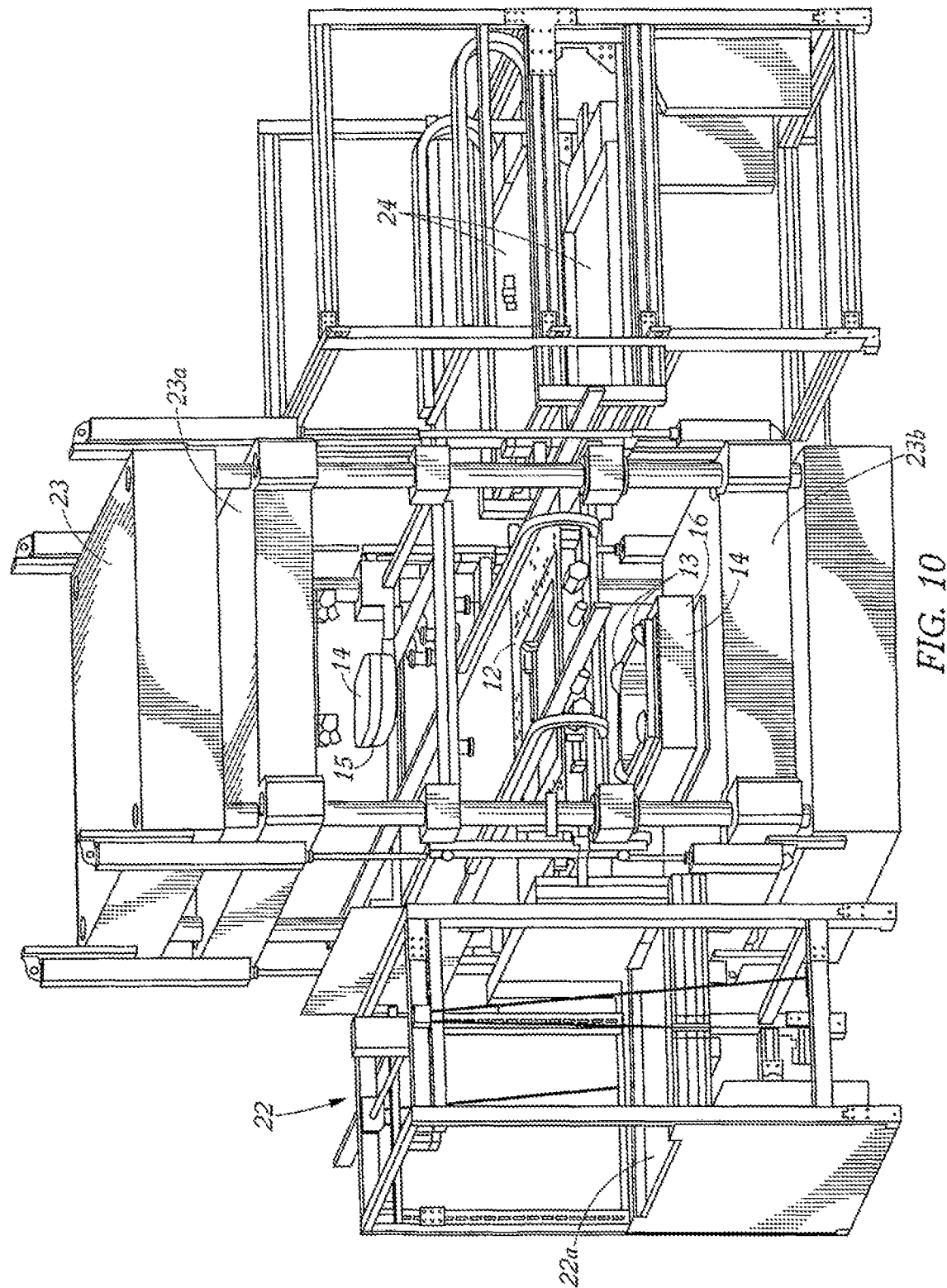
FIGS. 10 to 15 the embodiment of the apparatus according to FIG. 9 for different manufacturing steps and operational stages for manufacturing a luggage shell according to FIG. 1.

As shown in FIG. 10 the machinery is in the start position, ready to receive the sheet polymer material and associated lining textile for bonding same and for deep drawing both.

FIGS. 11 through 15 show the further operation of the apparatus performing the process of making a luggage shell according to this invention.

Figure 11:
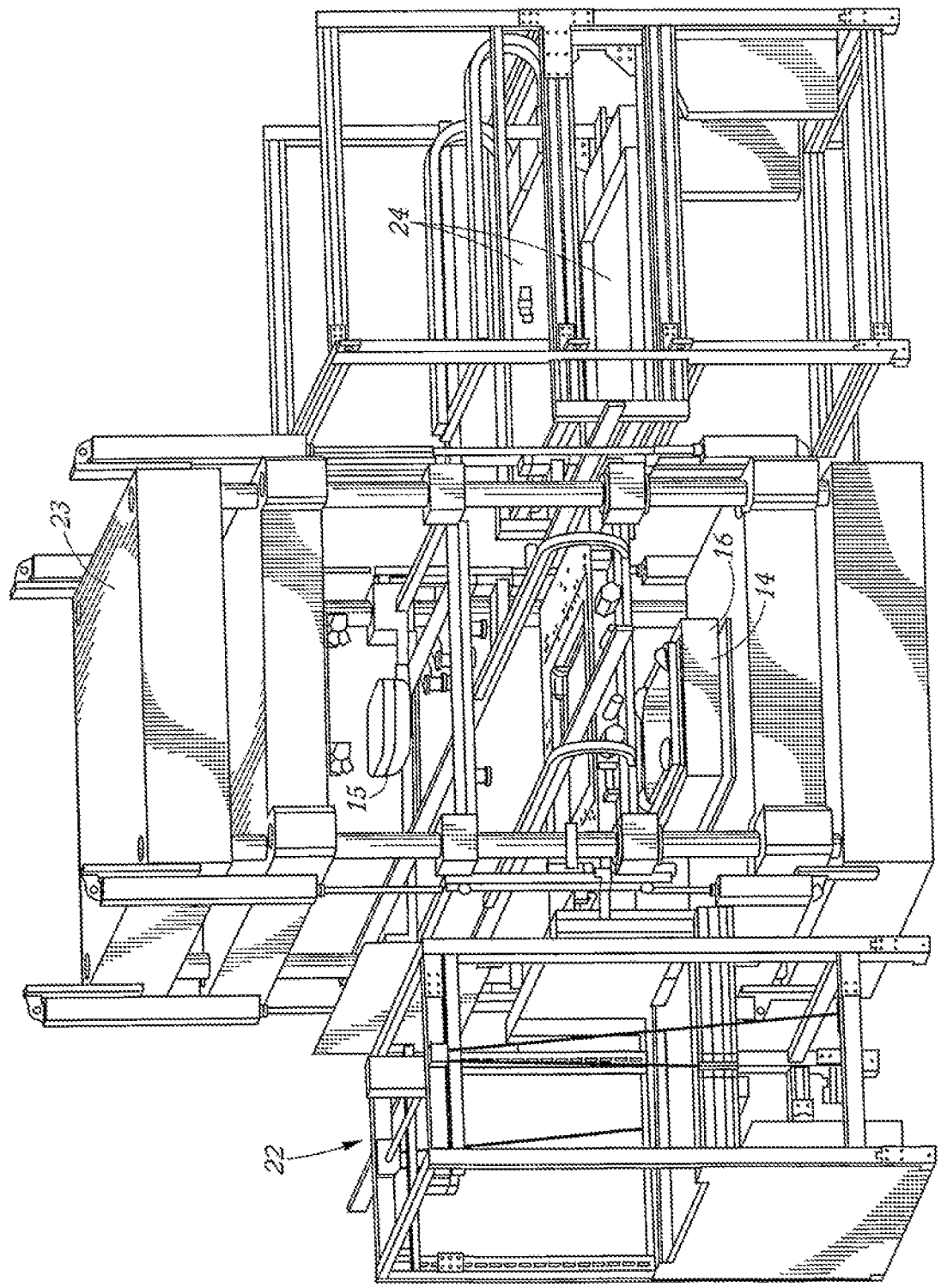
Figure 12:
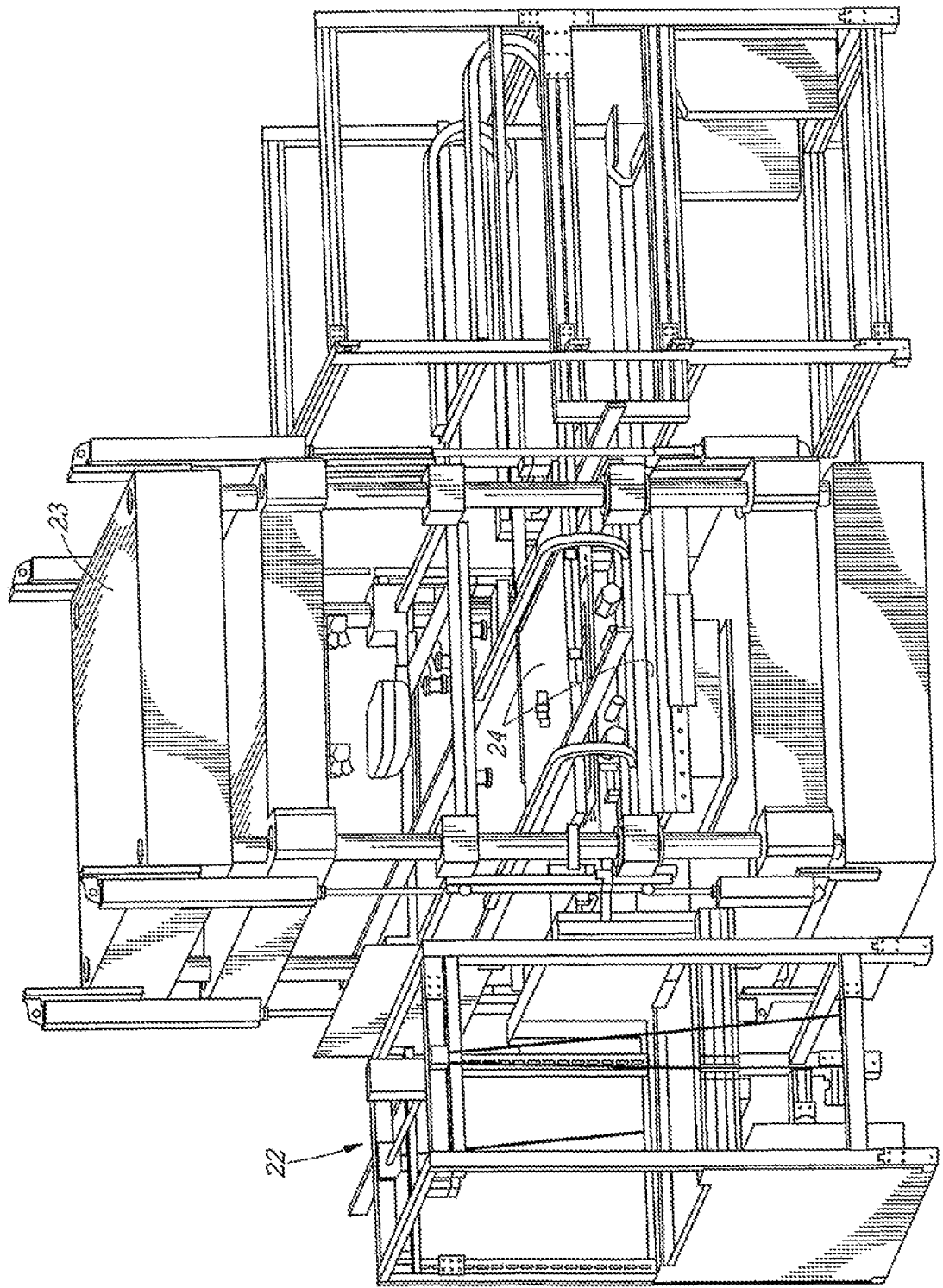

FIG. 11 shows the gripping rack 12 moved down ready to receive a warmed sheet of polymer from the supply behind the press 23. The sheet moves to above the gripping jaws 31, 32 (see FIGS. 22/23) and drops onto the four support bars 12b and the lower jaws 32 of the four gripping bars or jaws 31, 32. Immediately the radiant heaters 24 move quickly to above and below the thus gripped polymer sheet to bring it to processing temperature (FIG. 12). The gripping bars or jaws 31, 32 are hydraulically or pneumatically driven to pull and/or move the gripped edges of the polymer sheet 4 during heating and/or deep drawing. Once the sheet has been heated, the radiant heaters 24 move briskly back within their support rack and out of the way and the mold surfaces move to contact and shape the polymer sheet. Simultaneously with the heating and before molding, a sheet of textile lining, usually a knit tricot, is placed in position between the heater 24 and the upper mold tool 15.

Figure 13:
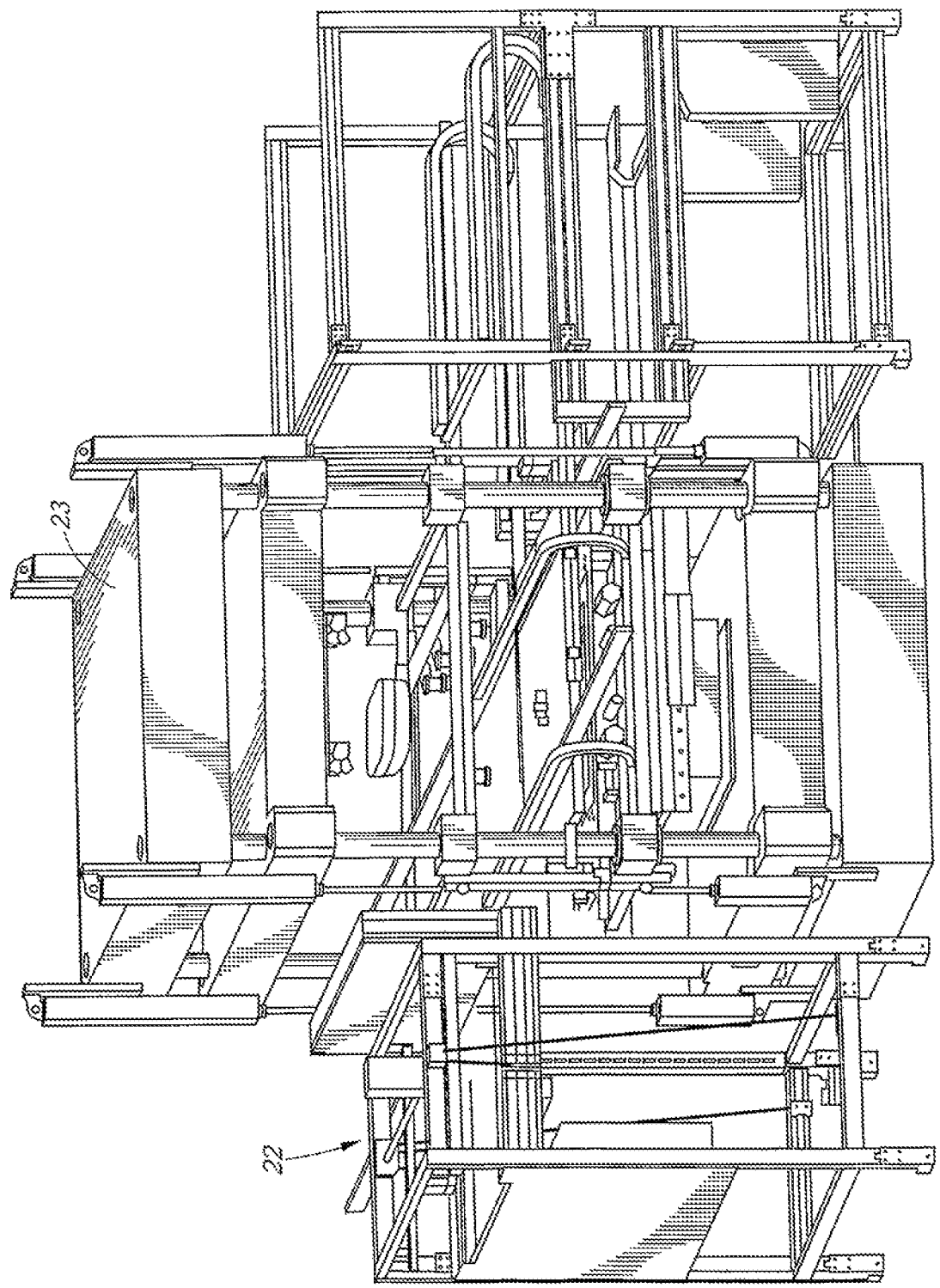
Figure 14:
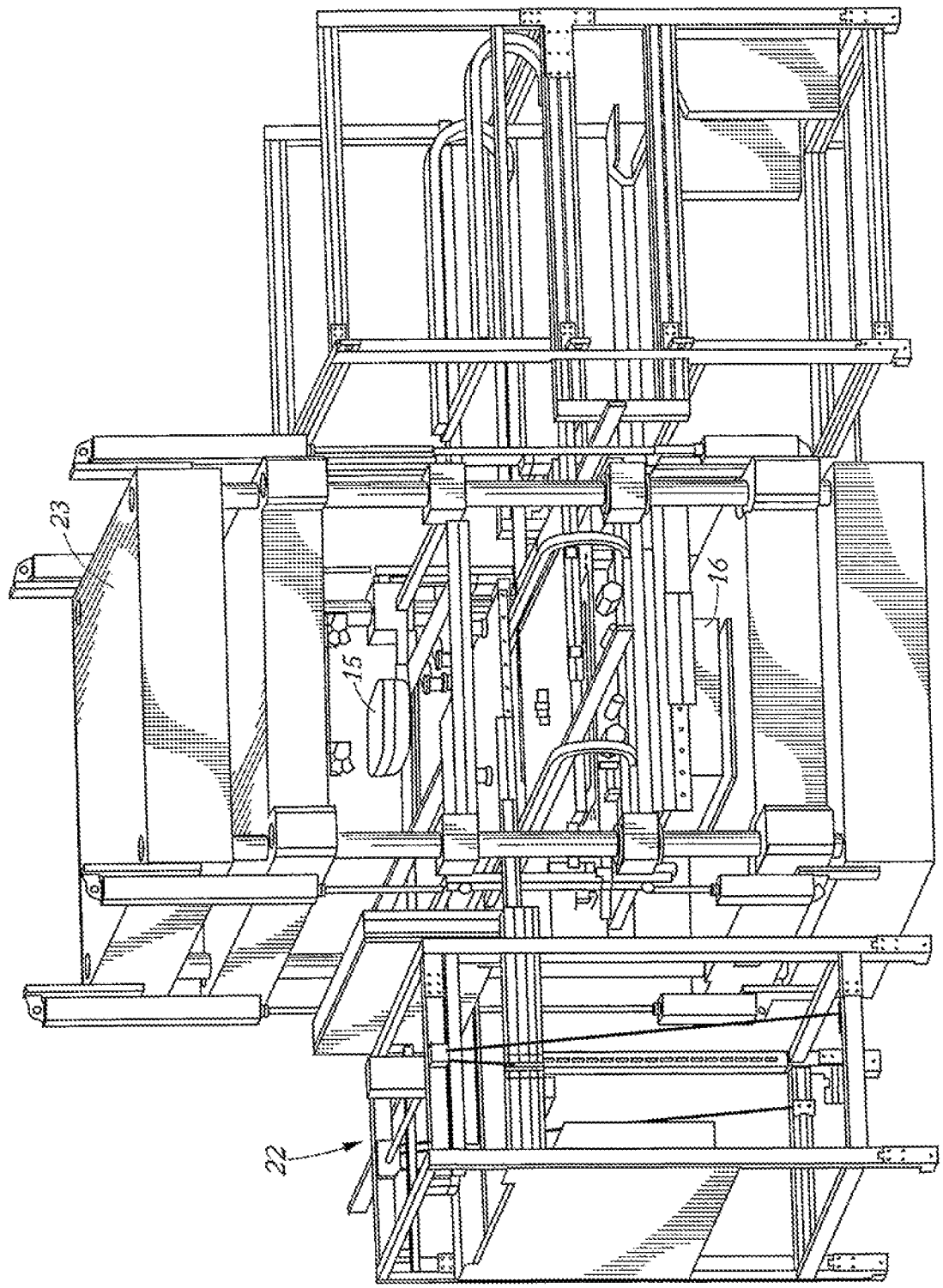
Figure 14A:
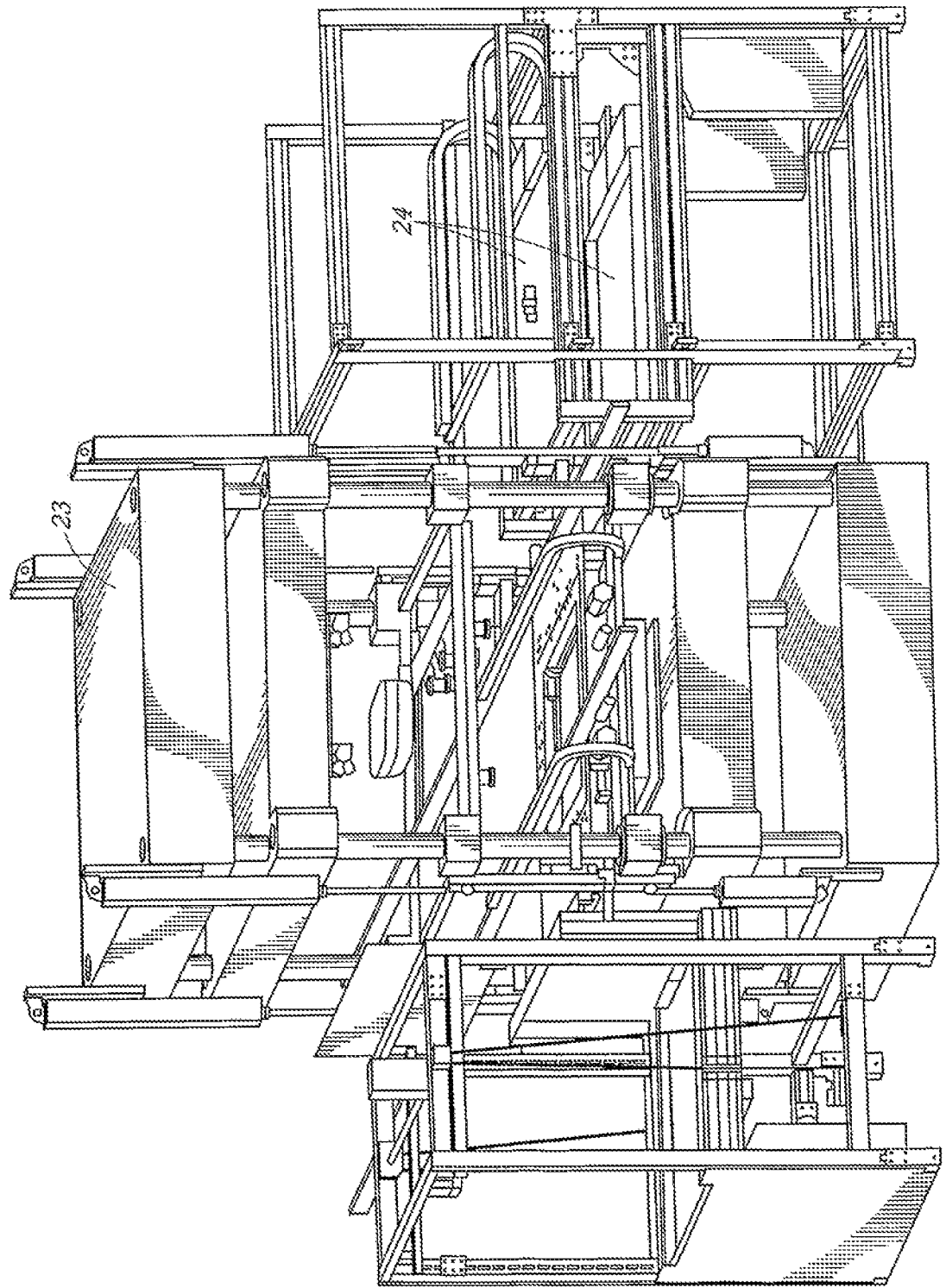

In FIG. 13, the lining storage tray 22a is brought in an elevated position and then the fabric lining is forwarded into the press 23 (FIG. 14).

Figure 15:
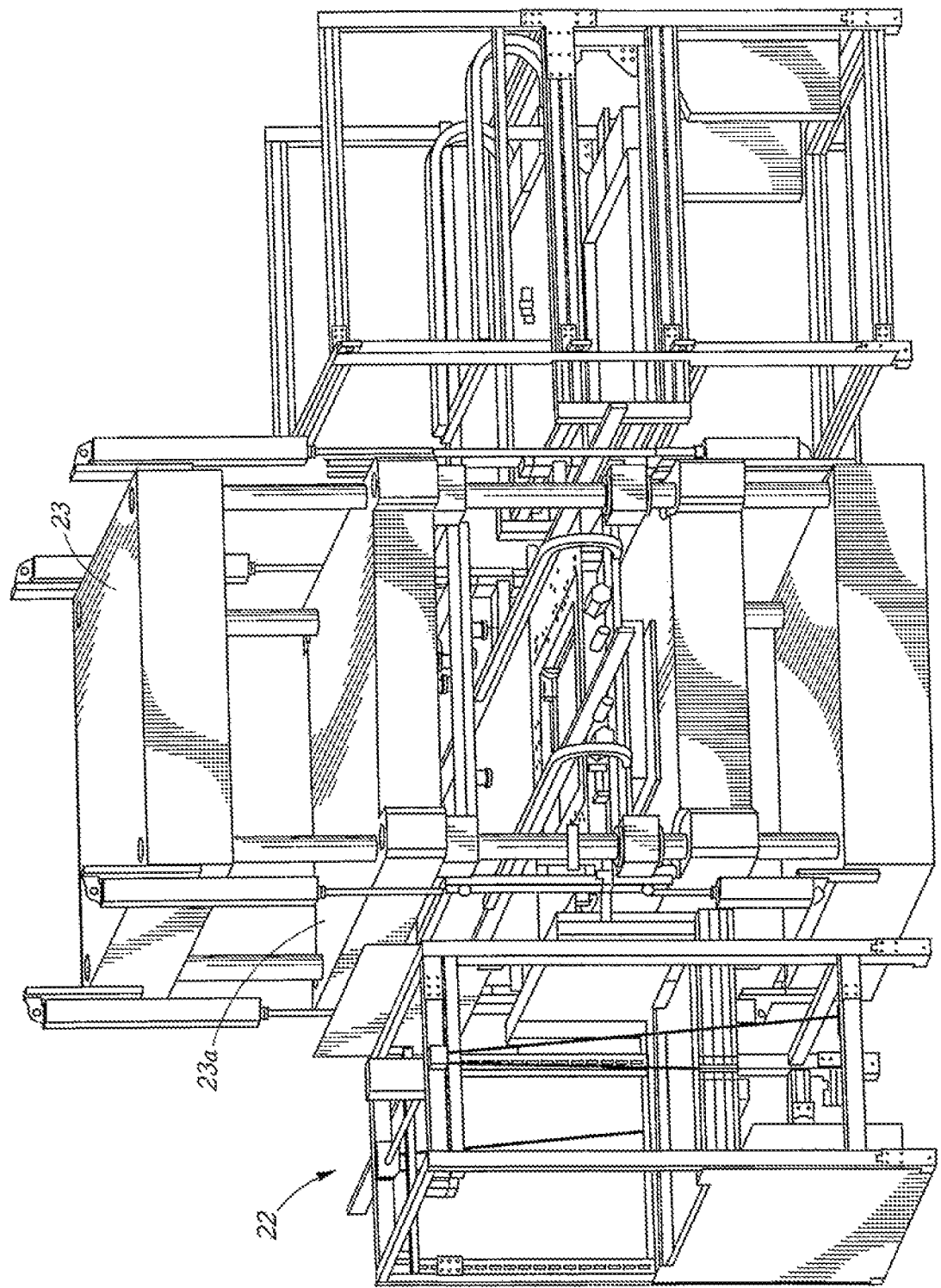

The lower mold, in this case the female deep draw mold 16 and auxiliary mold surfaces 13 move upwardly to contact the heated and stretched sheet. The upper male mold 15 moves down to force the sheet into contact with all the mold surfaces while simultaneously shaping and adhering the lining material to the thermoformed polymer sheet (FIG. 14.1, FIG. 15).

Figure 16:
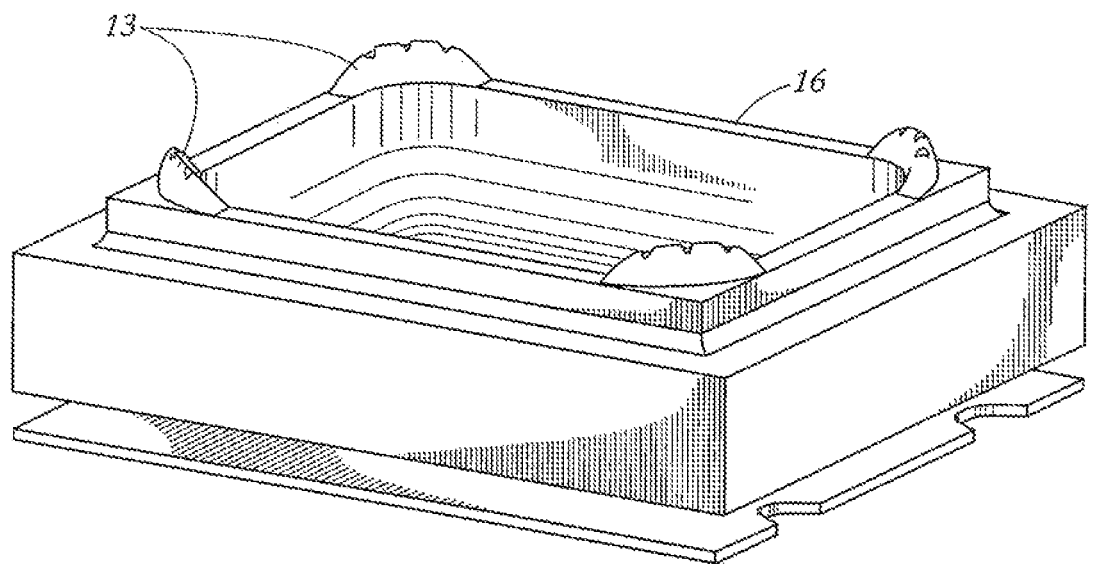
FIG. 16 a lower mold tool (female tool) for making a luggage shell according to the embodiment of the present invention schematically.
Figure 17:
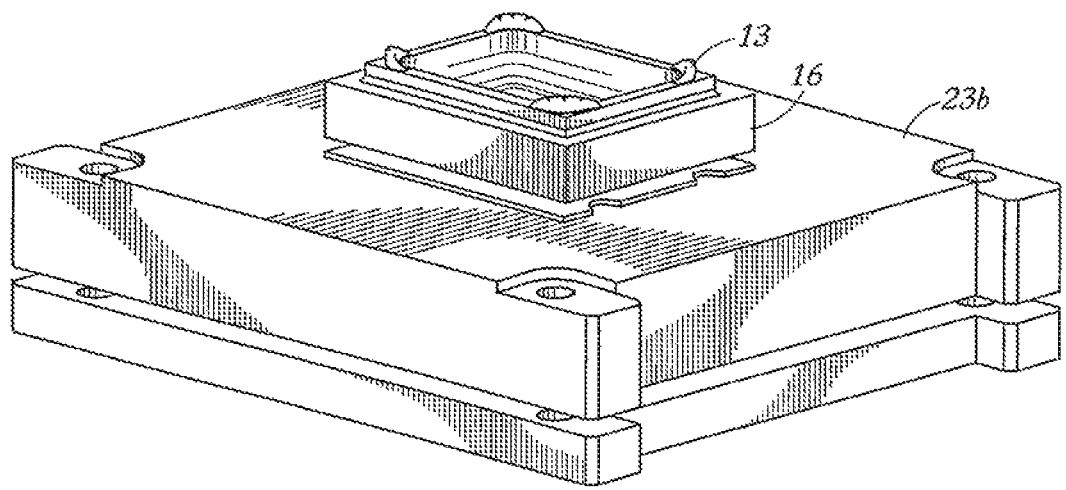
FIG. 17 a lower mold tool (female tool) as shown in FIG. 16 positioned on a movable table.
Figure 18:
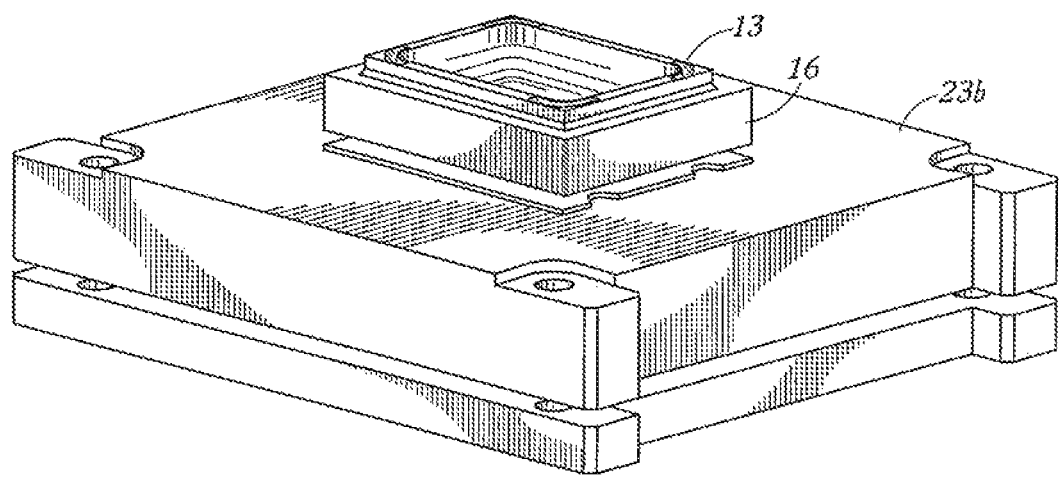
FIG. 18 a lower mold tool (female tool) as shown in FIG. 16 and FIG. 17 with the movable table of FIG. 17 being in a raised position while the auxiliary mold surfaces of the lower tool mold retracted.

FIGS. 16 to 18 show the lower mold 16 (female mold tool) isolated including auxiliary mold portions 13 disposed in the corner areas which assist to apply additional tension to the respective lamina or thermoplastic sheet (potentially lined with fabric) and to help overcoming the compression forces arising in that area. The auxiliary mold portions 13 are screwed to respective carriers which are retractable and projectable so that the auxiliary molds 13 themselves can be retracted into the lower mold 16 as shown in FIG. 18 or project therefrom (FIGS. 16, 17). Additionally, as shown in FIGS. 16 and 17, the lower table 23b itself can additionally be raised to adjust the respective tensioning of the sheet material in conjunction with the fine adjustment by the auxiliary mold portions 13.

Accordingly, the auxiliary mold surfaces and auxiliary mold portions 13 help gather up excess material that would otherwise accumulate at the corner regions and potentially wrinkle the molded shell corners. As is shown in FIG. 19, each of the auxiliary mold portions 13 may be individually driven by separate drives 13a which allow fine tuning of the introduction of respective tensile forces into the lamina and composite thermoplastic sheet material so that the appropriate flow of material and permanent tensioning of the molecularly oriented strands or fibers within the self-reinforced thermoplastic material can be maintained and the development of compression forces prevented reliably.

Figure 19:
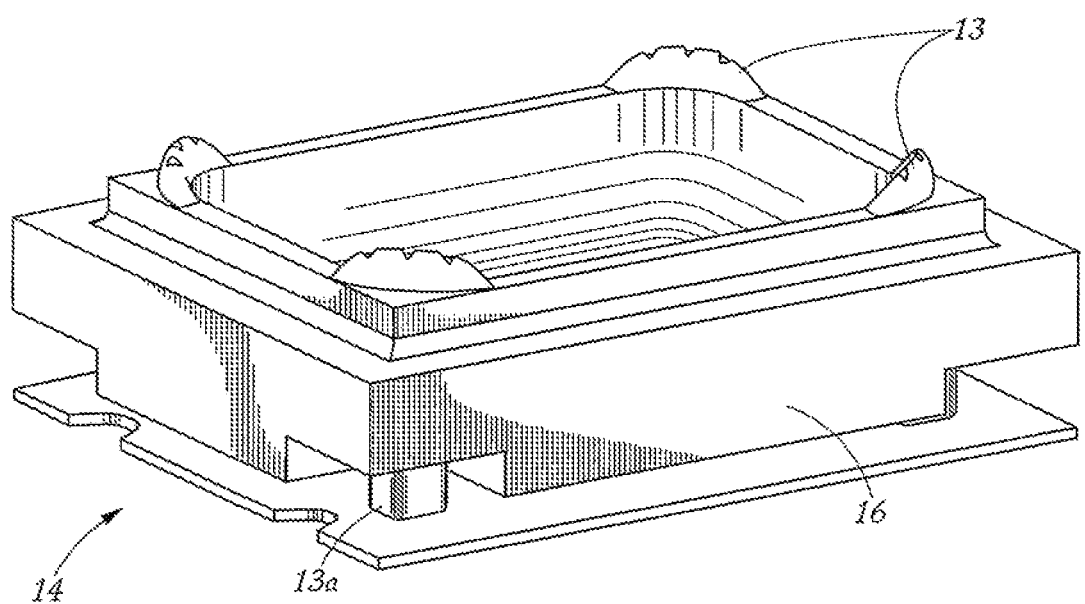
FIG. 19 a lower tool mold (female mold) similar to FIG. 16 for another embodiment with individual driven auxiliary mold surfaces.

Thus, an embodiment as shown schematically in FIG. 19 would be most preferred. In such a case, for example, keeping the auxiliary mold portions and surfaces 13 at those corner regions which are designed to exhibit the wheel receiving (castor housing accommodating) concavities out of contact with the polymer sheet could be beneficial to issue enough polymer material for these concavities.

Figure 20:
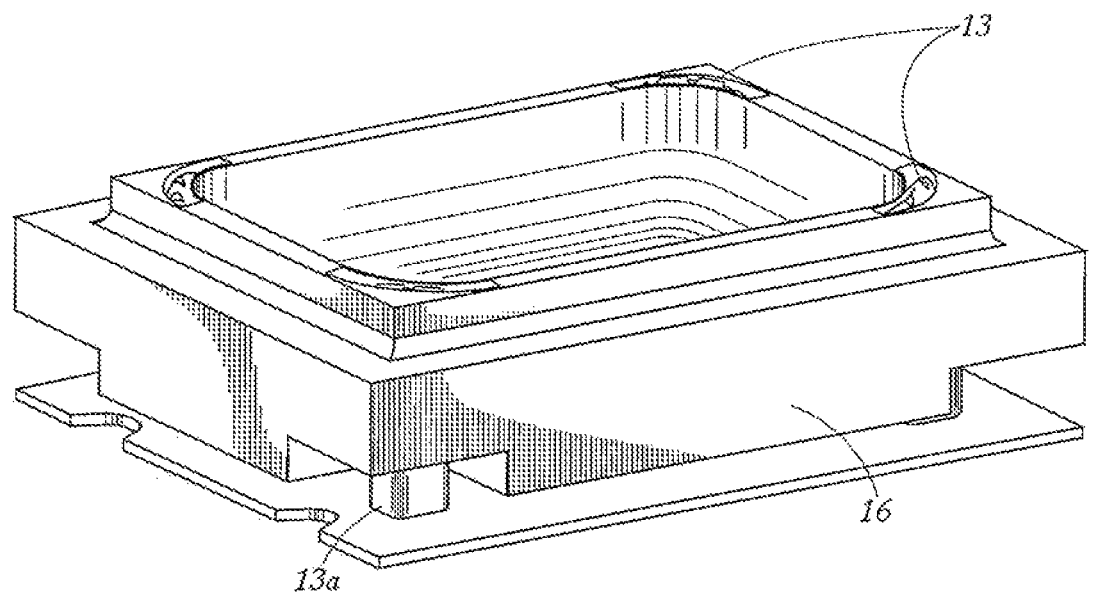
FIG. 20 the lower tool mold of FIG. 19 with the auxiliary mold surfaces retracted.

FIG. 20 shows the auxiliary mold portions or surfaces all in a retracted position.

Figure 21:
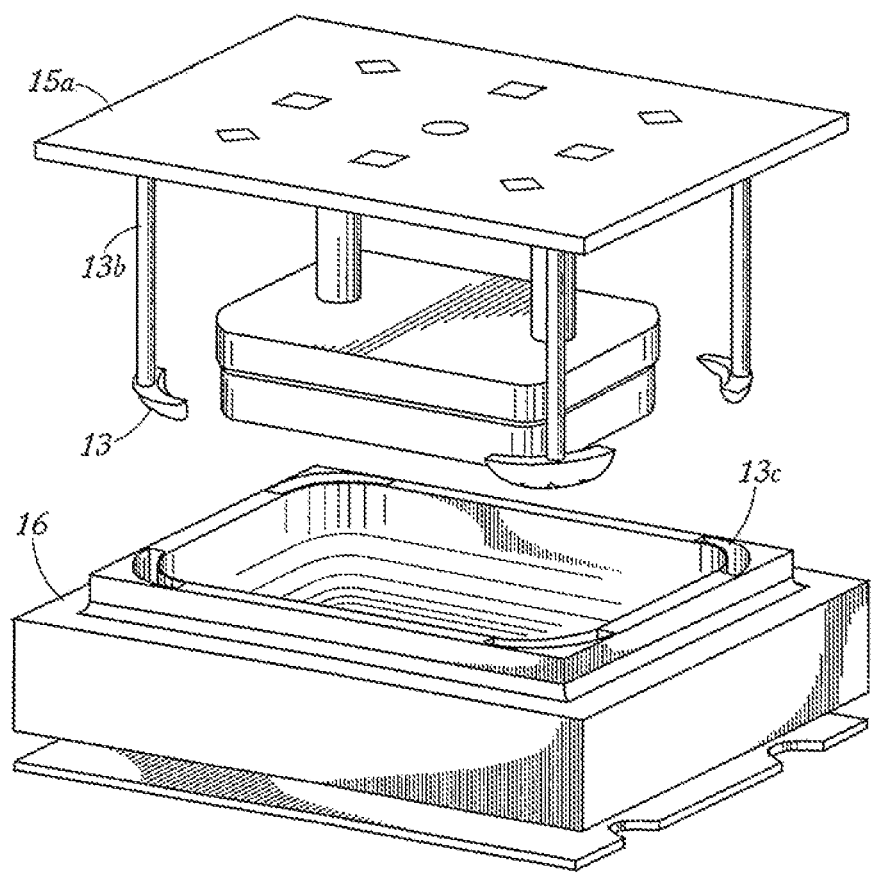
FIG. 21 another embodiment of upper and lower mold halves (male/female molds) wherein the auxiliary mold surfaces are arranged to contact the sheet material from above, opposite to the lower female mold.

FIG. 21 discloses another embodiment of upper and lower mold halves, wherein the auxiliary mold surfaces 13 are arranged to contact the sheet material from above, opposite to the lower female mold. They are disposed via a boss 13b supported at an upper mold plate 15a, which also supports the male mold 15. Respective recesses 13c are provided within the margin of the lower (female) mold 16 for the auxiliary mold portions 13 to engage. Of course, similarly as in the preceding embodiment, the precise position of the auxiliary mold surfaces and auxiliary mold portions 13 can also be fine-tuned by designing the support boss 13b to be telescopic or otherwise adjustable. Of course, the boss 13b may also be supported adjustably with respect to their length at the upper mold support plate 15a.

Figure 22:
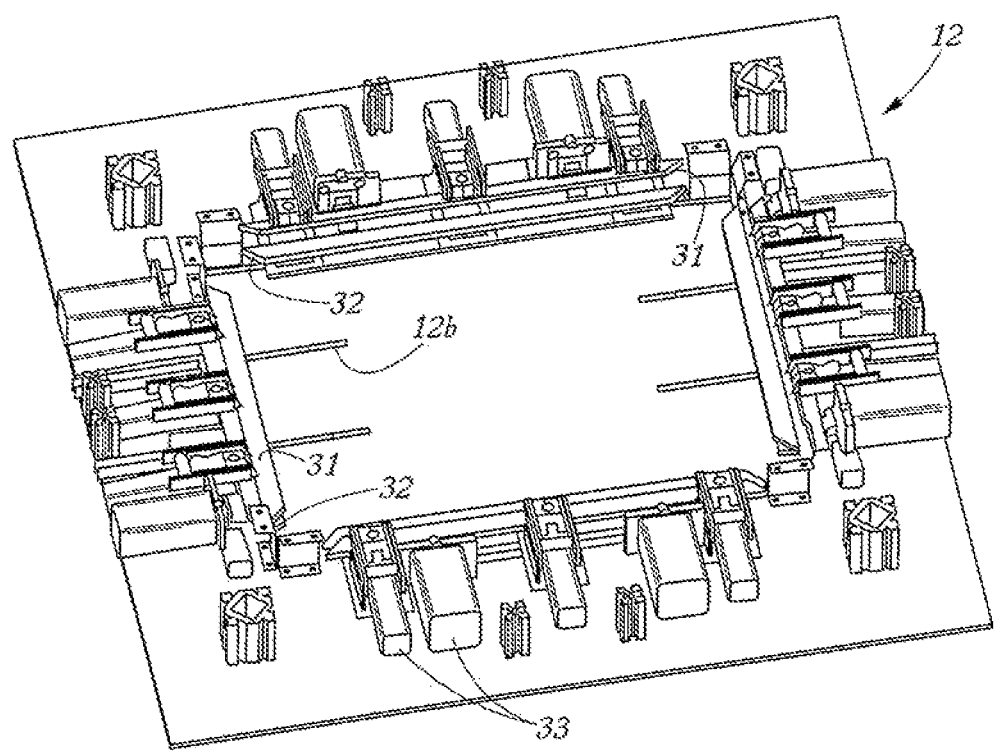
FIG. 22 a gripping device of the press forming (deep-drawing station) of the machinery of the apparatus of FIG. 9 in a schematic prospective view from above and isolated from the remainder tooling structure.
Figure 23:
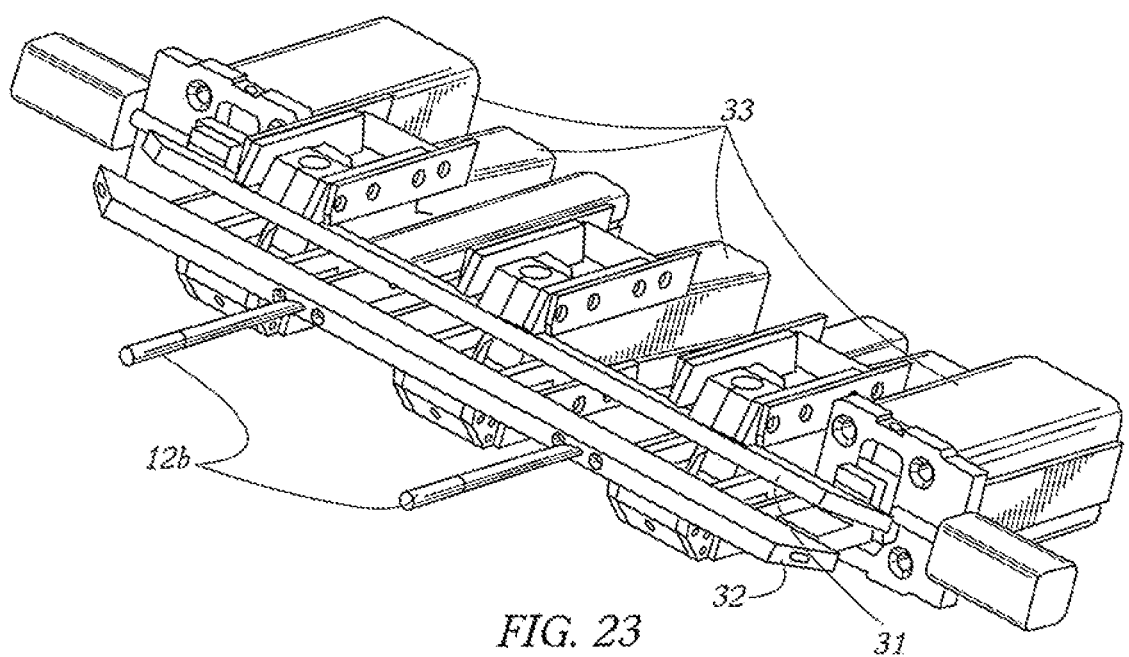
FIG. 23 one of the gripping bars of the gripping wreck of FIG. 22 in a schematic prospective view, and FIG. 24 a partial view of the gripping mechanism with the gripping jaws removed.
Figure 24:
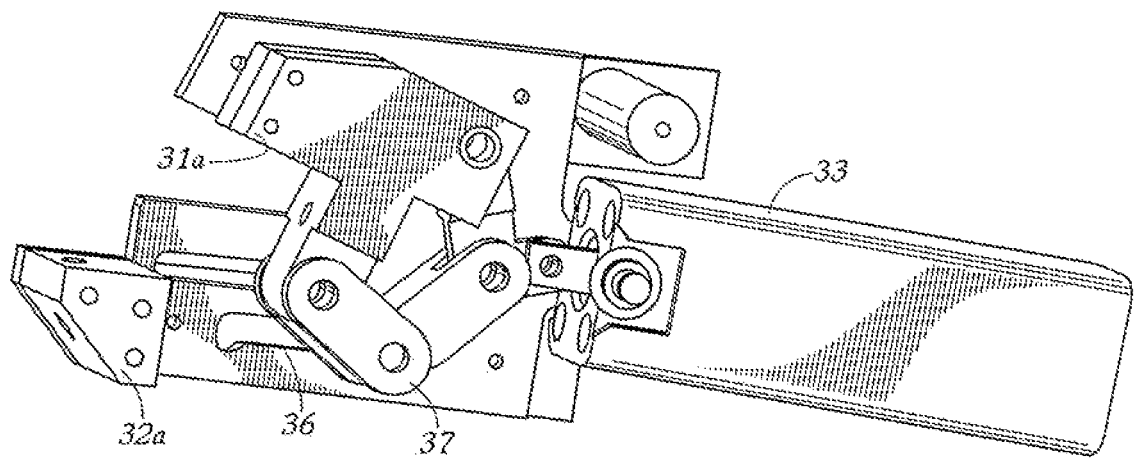

FIGS. 22 to 24 show details of the gripping wreck mechanism with FIG. 22 showing the gripping wreck 12 in a perspective view from above showing the support rods 12b for supporting the sheet material as well as the upper and lower gripping bars or gripping jaws 31, 32. The jaw operating drive unit 33 which drive the upper and lower gripping bars or jaws in response to a respective process control via a linkage mechanism, for example toggle lever mechanism, as shown in FIG. 24 may operate on an electrical, pneumatical or hydraulic bases.

Preferably, the lower gripping bar or jaw is stationary and the supporting rods 12b are affixed thereto while the upper gripping bar or jaw is movable with respect to the lower one to grip the material.

The tensioning control acting in this way on the sheet during press forming, i.e. deep-drawing same, may either be a passive one based on the molding process itself and clamping the edges of the respective thermo-plastic (in particular lined) material sheet or can also be actively performed, i.e. moving the respective and potentially more individualized clamping areas of the sheet actively to imply a certain tension to the reinforcing strands within the sheet material during the molding process.

FIG. 24 shows the partially exploded view of the operating assembly and gripping bar or jaw operators based on for example a cylinder rod projecting from an operating cylinder 33 and transferring an angular movement to an upper gripping bar or gripping jaw support 33a to move under assistance of a cam control groove 36 towards the lower gripping bar or jaw support via a linkage 37.

Figure 25:
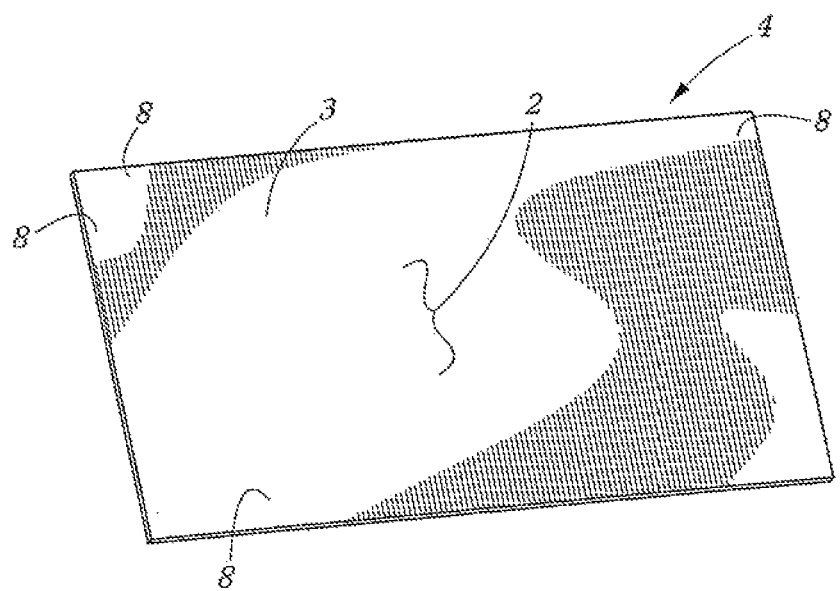
FIG. 25 a sample lamina (unlined)

Finally, FIG. 25 again embodies the lamina or base material 4 with a central portion 2, a field portion 3 and the respective edges 8.

Figure 26:
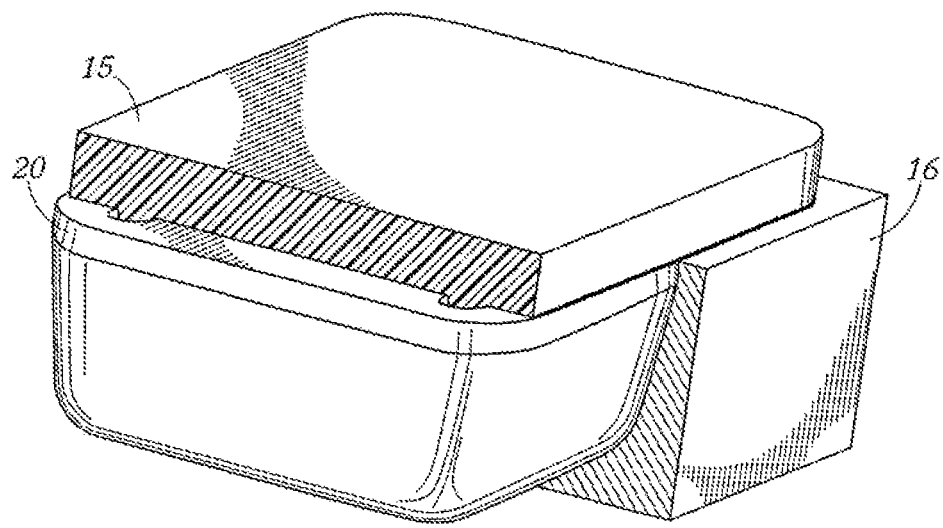
FIG. 26 another sample mold (modified deep-draw mold)
Figure 27:
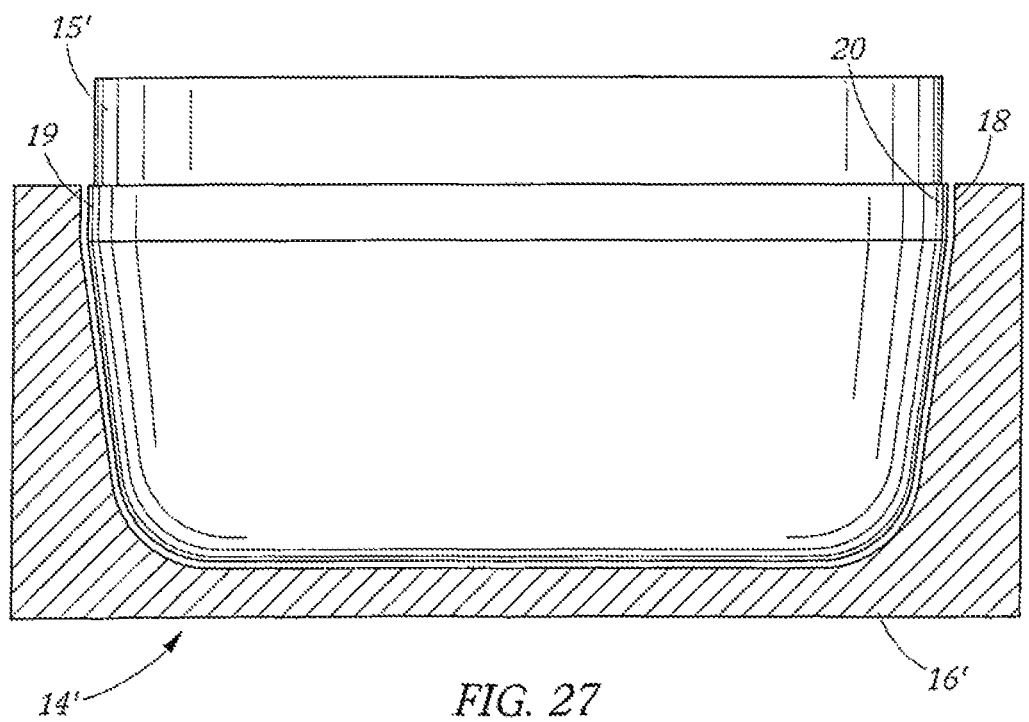
FIG. 27 a schematic cross-section of the mold of FIG. 26.

FIGS. 26 and 27 show an alternative embodiment of a deep-drawing module having a matching upper (male) mold 15' and a lower (female) mold 16' as another deep-drawing mold 14'. In that case, the female mold portion 16' has a perimeter mold surface 18 near the trim line. That perimeter portion has almost no draft angle. The male mold 15' comprising a perimeter mold surface 19 has an elastomeric section 20, in particular a molded silicon plug forming an expandable mold surface around the parameter so as to provide a controlled and reliable molding force to avoid wrinkles and any deformation, in particular in the corner areas of the shell.

By the afore-indicated methods and apparatuses, an ultra-light molded component implying at least in certain areas or regions an extraordinarily high degree of form change, such as a deep-drawn shell, in particular luggage shell, can be manufactured having a high depth to width/length ratio and unrivaled mechanical properties (i.e. strength, bending resistance, resistance against distortion and breakage) combined with highest dimensional and shaping accuracy and attractive appearance.

The invention provides a new product and process for manufacturing same on the basis of self-reinforced thermoplastic material by means of the step of tensioning said material (lamina), at least partially tensioning said lamina during all follow-up component shaping and/or molding steps up to a release of a component pre-form shape from the remainder lamina, to form the component.

The present invention allows the manufacturing of an ultra-light weight luggage shell on the basis of using self-reinforced thermoplastic material, the manufacturing of same can be further enhanced by permanently tensioning said material during all manufacturing steps up to the final finishing of the product.

The invention claimed is:

1. A luggage shell comprising:
   a main surface comprising alternating elongated grooves and elongated ribs;
   sidewalls adjacent the main surface, wherein the elongated ribs of the main surface curve along their length in a lengthwise direction relative to at least one of the sidewalls and curve along a substantial portion of a length of the luggage shell; and
   curved corner regions at intersections between the main surface and the sidewalls of the luggage shell, wherein each of the main surface, sidewalls, and the curved corner regions comprises a self-reinforced thermoplastic, wherein the self-reinforced thermoplastic comprises a laminate of molecular oriented layers compressed and bonded together by a matrix.

2. A luggage shell according to claim 1, wherein the elongated ribs have a wavelength and the elongated ribs curve continuously in said wavelength that is longer than a length dimension of the luggage shell.

3. A luggage shell according to claim 1, wherein the self-reinforced thermoplastic comprises oriented polypropylene oriented tapes woven together and layered with substantially unoriented polypropylene.

4. A luggage shell according to claim 1, wherein the shell has a ratio of a depth dimension to a width dimension between about 0.1 and about 0.5.

5. A luggage shell according to claim 1, wherein the shell has a ratio of a length dimension to a width dimension between about 1 and about 2.

6. A luggage shell according to claim 1, wherein the shell has a thickness between about 0.8 mm and about 2.0 mm.

7. A luggage shell according to claim 1, wherein the curved regions have a radius of curvature of about 80 mm or less.

8. A luggage shell comprising:
   a base wall comprising an outer face comprising alternating elongated grooves and elongated ribs, wherein more than one of the elongated ribs define at least one elongated curved and longitudinal edge, the elongated ribs of the base wall curve along their length and in a lengthwise direction relative to a side of the luggage shell adjacent the base wall, the elongated ribs curve along a substantial portion of a length of the luggage shell, and the at least one longitudinal edge of two or more ribs curve in the same direction;

upstanding sidewalls joined to the base wall; and at least one corner region at an intersection of the base wall and two of the upstanding sidewalls, wherein each of the base wall, upstanding sidewalls, and at least one corner region comprises a self-reinforced thermoplastic, wherein the self-reinforced thermoplastic comprises a laminate of molecular oriented layers compressed and bonded together by a matrix.

9. A luggage shell according to claim 8, wherein the upstanding sidewalls are joined to the base wall by a curve or a bend and that extends substantially transversely from the base wall.

10. A luggage shell according to claim 8, wherein the alternating elongated grooves and elongated ribs cover a substantial portion of the base wall.

11. A luggage shell according to claim 8, wherein the elongated ribs curve continuously in a wavelength that is longer than a length dimension of the luggage shell.

12. A luggage shell according to claim 8, wherein adjacent elongated ribs are offset relative to one another in a length direction by a portion of the characteristic wavelength.

13. A luggage shell according to claim 8, wherein the self-reinforced thermoplastic comprises tapes or oriented strands of different orientations.

14. A luggage shell according to claim 8, wherein the self-reinforced thermoplastic comprises oriented polypropylene oriented tapes woven together and layered with substantially unoriented polypropylene.

15. A luggage shell according to claim 8, wherein the shell has a ratio of a depth dimension to a width dimension between about 0.1 and about 0.5.

16. A luggage shell according to claim 8, wherein the shell has a ratio of a length dimension to a width dimension is between about 1 and about 2.

17. A luggage shell according to claim 8, wherein the at least one corner region has a radius of curvature of about 80 mm or less.

18. A luggage shell according to claim 8, wherein the shell has a thickness between about 0.8 mm and about 2.0 mm.

19. A luggage shell according to claim 1, wherein the elongated grooves and elongated ribs define a three dimensional stiffening pattern.

20. A method for producing the luggage shell of claim 1, wherein the method comprises press-forming the self-reinforced thermoplastic.

* * * * *